(12) United States Patent
Sato et al.

(10) Patent No.: US 10,237,521 B2
(45) Date of Patent: *Mar. 19, 2019

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Shun Sato, Matsumoto (JP); Tetsuo Terashima, Azumino (JP); Yoichi Nakagomi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 144 days.

This patent is subject to a terminal disclaimer.

(21) Appl. No.: 15/059,892

(22) Filed: Mar. 3, 2016

(65) Prior Publication Data

US 2016/0270197 A1   Sep. 15, 2016

(30) Foreign Application Priority Data

Mar. 9, 2015 (JP) ................................. 2015-045579
Mar. 9, 2015 (JP) ................................. 2015-045581

(51) Int. Cl.
*H04N 9/31* (2006.01)
*H05B 41/38* (2006.01)
*H05B 41/288* (2006.01)

(52) U.S. Cl.
CPC ......... *H04N 9/3123* (2013.01); *H04N 9/3155* (2013.01); *H04N 9/3179* (2013.01);
(Continued)

(58) Field of Classification Search
CPC .................................................. H04N 9/3123
(Continued)

(56) References Cited

U.S. PATENT DOCUMENTS 7,023,144 B2    4/2006  Suzuki et al.
7,391,165 B2 *  6/2008  Lee .......................... H02M 1/42
                                                                315/224

(Continued)

FOREIGN PATENT DOCUMENTS

CN      101959357 A     1/2011
JP      2006059790 A    3/2006
(Continued)

OTHER PUBLICATIONS

Apr. 19, 2016 Extended Search Report issued in European Patent Application No. 16 15 8722.5.

(Continued)

*Primary Examiner* — Brian P Yenke
*Assistant Examiner* — Justin B Sanders
(74) *Attorney, Agent, or Firm* — Oliff PLC

(57) ABSTRACT

According to an aspect of the invention, a discharge lamp driving device includes a discharge lamp driving section, a control section, and a voltage detecting section. The control section is configured to execute a first discharge lamp driving for executing a first control and a second control for supplying a driving current including a direct current and an alternating current to a discharge lamp. In the first discharge lamp driving, the control section executes the first control when the interelectrode voltage is equal to or smaller than a first threshold voltage at predetermined setting timing and executes the second control when the interelectrode voltage is larger than the first threshold voltage at the predetermined setting timing. A rate of the direct current in the second control is larger than a rate of the direct current in the first control.

18 Claims, 13 Drawing Sheets

(52) U.S. Cl.
CPC ....... *H04N 9/3197* (2013.01); *H05B 41/2886* (2013.01); *H05B 41/2887* (2013.01); *Y02B 20/202* (2013.01)

(58) Field of Classification Search
USPC .......................................................... 348/751
See application file for complete search history.

(56) References Cited

U.S. PATENT DOCUMENTS

| | | | | |
|---|---|---|---|---|
| 8,237,378 B2* | 8/2012 | Terashima | ......... | H05B 41/2928 315/200 R |
| 8,269,424 B2 | 9/2012 | Terashima | | |
| 8,853,961 B2 | 10/2014 | Terashima | | |
| 9,152,027 B2* | 10/2015 | Terashima | ......... | G03B 21/2026 |
| 2003/0080693 A1* | 5/2003 | Ono | ................... | H05B 41/2925 315/224 |
| 2005/0206326 A1 | 9/2005 | Suzuki et al. | | |
| 2008/0024853 A1* | 1/2008 | Tanaka | ............... | H05B 41/2883 359/238 |
| 2008/0198337 A1 | 8/2008 | Kitagawa | | |
| 2009/0237625 A1 | 9/2009 | Yamauchi | | |
| 2010/0033103 A1 | 2/2010 | Kimura et al. | | |
| 2010/0109542 A1* | 5/2010 | Komatsu | ............ | H05B 41/2882 315/224 |
| 2010/0127631 A1* | 5/2010 | Okamoto | ........... | H05B 41/2888 315/246 |
| 2011/0012524 A1 | 1/2011 | Terashima | | |
| 2011/0012525 A1* | 1/2011 | Terashima | ......... | H05B 41/2883 315/246 |
| 2011/0063584 A1* | 3/2011 | Hirao | ................. | H05B 41/2883 353/85 |
| 2011/0121746 A1* | 5/2011 | Yamamoto | ......... | H05B 41/2882 315/287 |
| 2012/0043904 A1 | 2/2012 | Terashima | | |
| 2012/0074858 A1* | 3/2012 | Ono | ................... | H05B 41/2883 315/209 R |
| 2013/0038844 A1 | 2/2013 | Suzuki et al. | | |
| 2014/0063471 A1 | 3/2014 | Suzuki et al. | | |
| 2014/0168391 A1 | 6/2014 | Terashima et al. | | |

FOREIGN PATENT DOCUMENTS

| | | |
|---|---|---|
| JP | 2012-43678 A | 3/2012 |
| JP | 5278212 B2 | 9/2013 |
| JP | 2014-67734 A | 4/2014 |

OTHER PUBLICATIONS

Apr. 12, 2016 Search Report issued in European Patent Application No. 16 15 8722.

Apr. 19, 2016 Search Report issued in European Patent Application No. 16 15 8724.1.

* cited by examiner

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

For example, JP-A-2006-59790 (Patent Literature 1) describes a discharge lamp lighting device that supplies, to a discharge lamp, an alternating current having a steady lighting frequency and an alternating current having a frequency lower than the steady lighting frequency and forms protrusions at electrode distal ends of the discharge lamp.

Incidentally, the protrusions at the electrode distal ends of the discharge lamp are less easily formed as the discharge lamp is further deteriorated. Therefore, in the driving method for the discharge lamp explained above, it is difficult to maintain a stable electrode shape when the discharge lamp is deteriorated. Consequently, it is likely that the life of the discharge lamp cannot be sufficiently increased.

SUMMARY

An advantage of some aspects of the invention is to provide a discharge lamp driving device that can increase the life of a discharge lamp, a light source device including the discharge lamp driving device, and a projector including the light source device. Another advantage of some aspects of the invention is to provide a discharge lamp driving method that can increase the life of the discharge lamp.

A discharge lamp driving device according to an aspect of the invention includes: a discharge lamp driving section configured to supply a driving current to a discharge lamp; a control section configured to control the discharge lamp driving section; and a voltage detecting section configured to detect an interelectrode voltage of the discharge lamp. The control section is configured to execute a first discharge lamp driving for executing a first control and a second control for supplying the driving current including a direct current and an alternating current to the discharge lamp. In the first discharge lamp driving, the control section executes the first control when the interelectrode voltage is equal to or smaller than a first threshold voltage at predetermined setting timing and executes the second control when the interelectrode voltage is larger than the first threshold voltage at the predetermined setting timing. A rate of the direct current in the second control is larger than a rate of the direct current in the first control.

With the discharge lamp driving device according to this aspect, the first control and the second control are executed as appropriate according to the interelectrode voltage. The rate of the direct current in the second control is larger than the rate of the direct current in the first control. Therefore, when protrusions at electrode distal ends of the discharge lamp are worn by the first control and the interelectrode voltage rises to be larger than the first threshold voltage, it is possible to grow the protrusions by switching the first control to the second control in which the rate of the direct current is larger than the rate in the first control.

For example, after the first control is switched to the second control, when the discharge lamp driving section continues to be controlled in the second control, electrodes are melted. As a result, although the protrusions are formed, electrode main bodies, on which the protrusions are formed, are worn. A stable shape of the electrodes cannot be maintained.

On the other hand, with the discharge lamp driving device according to the aspect, after switching to the second control, when the protrusions grow and the interelectrode voltage drops to be equal to or smaller than the first threshold voltage, the control method for the discharge lamp driving section is switched to the first control again. Consequently, it is possible to suppress the wear of the electrode main bodies. Further, it is possible to maintain the interelectrode voltage within a fixed range centering on the first threshold voltage.

As explained above, with the discharge lamp driving device according to the aspect, by switching the first control and the second control, it is possible to maintain a stable electrode shape while maintaining the interelectrode voltage within the fixed range. As a result, it is possible to increase the life of the discharge lamp.

The alternating current in the first control may include a first alternating current having a first frequency and a second alternating current having a second frequency lower than the first frequency. The control section may adjust a rate of the first alternating current and a rate of the second alternating current on the basis of the first threshold voltage.

With this configuration, it is possible to appropriately set a driving current waveform in the first control on the basis of the magnitude of the first threshold voltage. Therefore, it is possible to further increase the life of the discharge lamp.

The control section may set the rate of the second alternating current larger than the rate of the first alternating current when the first threshold voltage is equal to or smaller than a predetermined value and set the rate of the first alternating current larger than the rate of the second alternating current when the firth threshold voltage is larger than the predetermined value.

With this configuration, it is possible to appropriately set the first control with respect to the first threshold voltage by determining whether the first threshold voltage is equal to or smaller than the predetermined value.

The first frequency may be equal to or higher than 500 Hz.

With this configuration, it is possible to suppress the electrodes from being excessively worn.

The second frequency may be equal to or lower than 280 Hz.

With this configuration, it is possible to suppress the electrodes from excessively growing.

The control section may be configured to execute a second discharge lamp driving for executing a third control and a fourth control for supplying the driving current including the direct current and the alternating current to the discharge lamp. In the second discharge lamp driving, the control section may execute the third control when the interelectrode voltage is equal to or smaller than a second threshold voltage larger than the first threshold voltage at the predetermined setting timing and execute the fourth control when the interelectrode voltage is larger than the second threshold voltage at the predetermined setting timing. A rate of the direct current in the fourth control may be larger than a rate of the direct current in the third control and larger than the rate of the direct current in the second control. In the second control of the first discharge lamp driving, the control section may shift from the first discharge lamp driving to the second discharge lamp driving when the interelectrode voltage is larger than a first shift voltage equal to or larger than the first threshold voltage and a continuous execution time of the second control is equal to or longer than a first shift time.

With this configuration, the control section is capable of executing the first discharge lamp driving and the second discharge lamp driving. When only the first discharge lamp driving is executed for a long time, the interelectrode voltage of the discharge lamp sometimes does not drop. In such a case, it is possible to further increase the life of the discharge lamp by shifting the driving of the discharge lamp to the second discharge lamp driving.

The first shift voltage may be larger than the first threshold voltage.

With this configuration, it is possible to appropriately shift the driving of the discharge lamp from the first discharge lamp driving to the second discharge lamp driving.

The first shift voltage may be smaller than the second threshold voltage.

With this configuration, before the discharge lamp is excessively deteriorated, it is possible to shift the driving of the discharge lamp from the first discharge lamp driving to the second discharge lamp driving.

The rate of the direct current in the third control may be substantially equivalent to the rate of the direct current in the first control.

With this configuration, it is possible to set a difference between a heat load of the third control and a heat load of the fourth control larger than a difference between a heat load of the first control and a heat load of the second control. Therefore, it is easier to grow the protrusions of the electrodes in the fourth control of the second discharge lamp driving.

Each of the alternating current in the first control and the alternating current in the third control may include a first alternating current having a first frequency and a second alternating current having a second frequency lower than the first frequency. The control section may adjust, in the first control, a rate of the first alternating current and a rate of the second alternating current on the basis of the first threshold voltage and adjust, in the third control, the rate of the first alternating current and the rate of the second alternating current on the basis of the second threshold voltage.

With this configuration, it is possible to appropriately set a driving current waveform in the first control on the basis of the magnitude of the first threshold voltage. Therefore, it is possible to further increase the life of the discharge lamp.

The control section may set, in the first control, the rate of the second alternating current larger than the rate of the first alternating current when the first threshold voltage is equal to or smaller than a predetermined value and set the rate of the first alternating current larger than the rate of the second alternating current when the first threshold voltage is larger than the predetermined value and may set, in the third control, the rate of the second alternating current larger than the rate of the first alternating current when the second threshold voltage is equal to or smaller than the predetermined value and set the rate of the first alternating current larger than the rate of the second alternating current when the second threshold voltage is larger than the predetermined value.

With this configuration, it is possible to appropriately set the first control with respect to the first threshold voltage by determining whether the first threshold voltage is equal to or smaller than the predetermined value.

The control section may be configured to execute a third discharge lamp driving for executing a fifth control and a sixth control for supplying the driving current including the direct current and the alternating current to the discharge lamp. In the third discharge lamp driving, the control section may execute the fifth control when the interelectrode voltage is equal to or smaller than a third threshold voltage larger than the second threshold voltage at the predetermined setting timing and execute the sixth control when the interelectrode voltage is larger than the third threshold voltage at the predetermined setting timing. A rate of the direct current in the sixth control may be larger than a rate of the direct current in the fifth control and larger than the rate of the direct current in the fourth control. In the fourth control of the second discharge lamp driving, the control section may shift from the second discharge lamp driving to the third discharge lamp driving when the interelectrode voltage is larger than a second shift voltage equal to or larger than the third threshold voltage and a continuous execution time of the fourth control is equal to or longer than a second shift time.

With this configuration, it is possible to further increase the life of the discharge lamp.

The predetermined setting timing may be provided for each predetermined time.

With this configuration, it is possible to alternately execute the first control and the second control for each predetermined degree of time. Therefore, it is easy to maintain a stable electrode shape.

A light source device according to another aspect of the invention includes: the discharge lamp configured to emit light and the discharge lamp driving device.

With the light source device according to the aspect, since the light source device includes the discharge lamp driving device, it is possible to increase the life of the discharge lamp.

A projector according to still another aspect of the invention includes: the light source device; a light modulating element configured to modulate, according to a video signal, light emitted from the light source device; and a projection optical system configured to project the light modulated by the light modulating element.

With the projector according to the aspect, since the projector includes the light source device, it is possible to increase the life of the discharge lamp.

A discharge lamp driving method according to yet another aspect of the invention is a discharge lamp driving method for supplying a driving current to a discharge lamp and driving the discharge lamp, the discharge lamp driving method including a first discharge lamp driving for executing a first control and a second control for supplying the driving current including a direct current and an alternating current to the discharge lamp. The discharge lamp driving method includes, in the first discharge lamp driving, executing the first control when an interelectrode voltage of the discharge lamp is equal to or smaller than a first threshold voltage at predetermined setting timing and executing the second control when the interelectrode voltage is larger than the first threshold voltage at the predetermined setting timing. A rate of the direct current in the second control is larger than a rate of the direct current in the first control.

With the discharge lamp driving method according to the aspect, in the same manner as explained above, it is possible to increase the life of the discharge lamp.

The discharge lamp driving method may include a second discharge lamp driving for executing a third control and a fourth control for supplying the driving current including the direct current and the alternating current to the discharge lamp. The discharge lamp driving method may further include, in the second discharge lamp driving, executing the third control when the interelectrode voltage is equal to or smaller than a second threshold voltage larger than the first threshold voltage at the predetermined setting timing and executing the fourth control when the interelectrode voltage is larger than the second threshold voltage at the predetermined setting timing. A rate of the direct current in the fourth control may be larger than a rate of the direct current in the third control and larger than the rate of the direct current in the second control. In the second control of the first discharge lamp driving, the discharge lamp driving method may shift from the first discharge lamp driving to the second discharge lamp driving when the interelectrode voltage is larger than a first shift voltage equal to or larger than the first threshold voltage and a continuous execution time of the second control is equal to or longer than a first shift time.

With this configuration, in the same manner as explained above, it is possible to increase the life of the discharge lamp.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
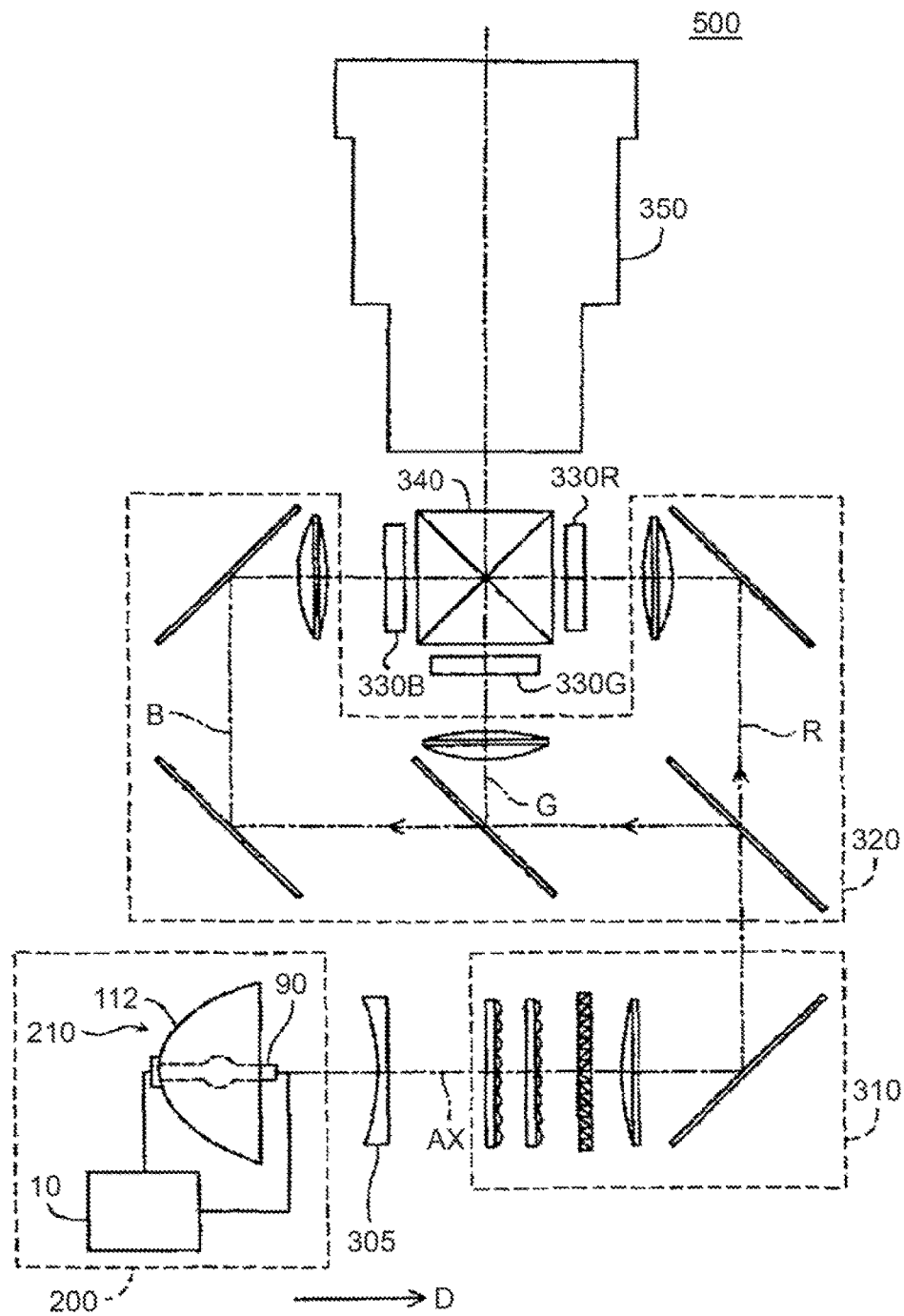
FIG. 1 is a schematic diagram of a projector according to a first embodiment.

Projectors according to embodiments of the invention are explained below with reference to the drawings.

Note that the scope of the invention is not limited by the embodiments explained below and can be optionally changed within the scope of the technical idea of the invention. In the drawings referred to below, scales, numbers, and the like in structures are varied from those in actual structures in order to clearly show components.

First Embodiment

As shown in FIG. 1, a projector 500 according to this embodiment includes a light source device 200, a collimating lens 305, an illumination optical system 310, a color separation optical system 320, three liquid crystal light valves (light modulating elements) 330R, 330G, and 330B, a cross-dichroic prism 340, and a projection optical system 350.

Light emitted from the light source device 200 is transmitted through the collimating lens 305 and made incident on the illumination optical system 310. The collimating lens 305 collimates the light emitted from the light source device 200.

The illumination optical system 310 adjusts the illuminance of the light emitted from the light source device 200 to equalize the illuminance on the liquid crystal light valves 330R, 330G, and 330B. Further, the illumination optical system 310 aligns polarization directions of the light emitted from the light source device 200 in one direction. This is for the purpose of effectively using the light emitted from the light source device 200 in the liquid crystal light valves 330R, 330G, and 330B.

The light with the illuminance distribution and the polarization directions adjusted is made incident on the color separation optical system 320. The color separation optical system 320 separates the incident light into three color lights of red light (R), green light (G), and blue light (B). The three color lights are respectively modulated according to video signals by the liquid crystal light valves 330R, 330G, and 330B associated with the color lights. The liquid crystal light valves 330R, 330G, and 330B include liquid crystal panels 560R, 560G, and 560B explained below and polarizing plates (not shown in the figure). The polarizing plates are disposed on light incident sides and light emission sides of the respective liquid crystal panels 560R, 560G, and 560B.

The modulated three color lights are combined by the cross-dichroic prism 340. The combined light is made incident on the projection optical system 350. The projection optical system 350 projects the incident light on a screen 700 (see FIG. 3). Consequently, a video is displayed on the screen 700. Note that, as configurations of the collimating lens 305, the illumination optical system 310, the color separation optical system 320, the cross-dichroic prism 340, and the projection optical system 350, well-known configurations can be adopted.

Figure 2:
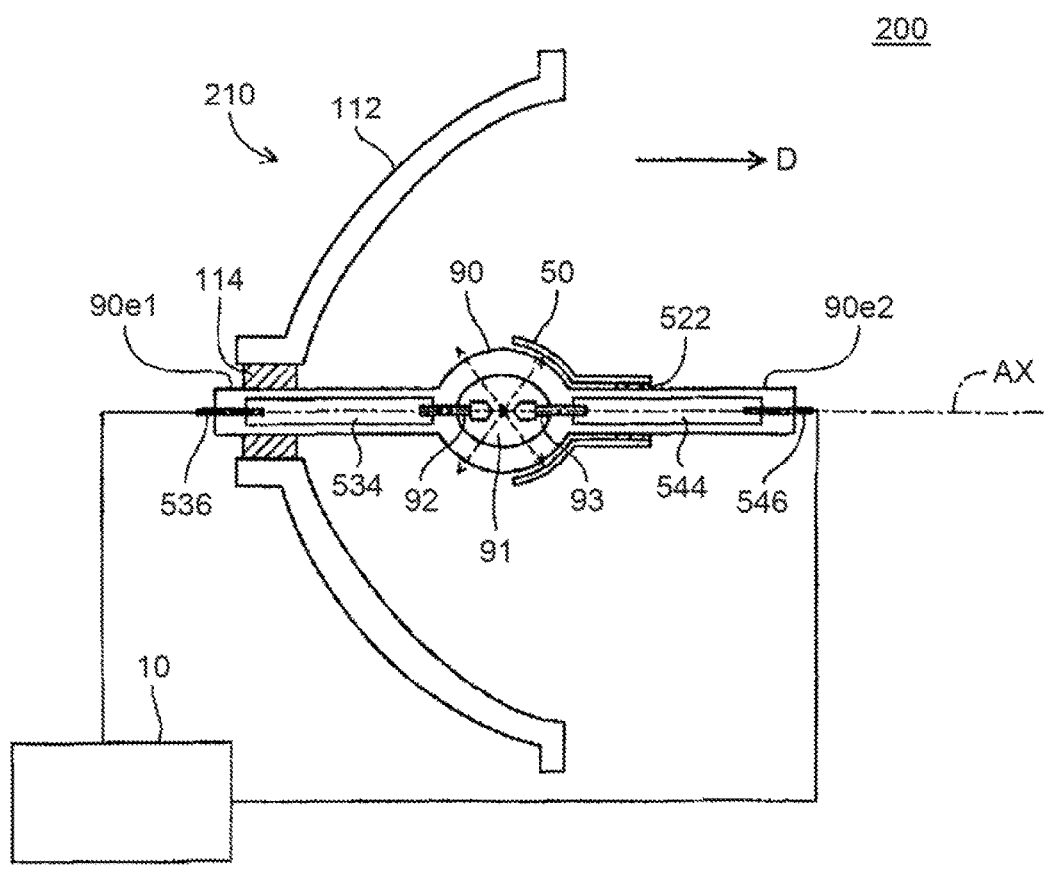
FIG. 2 is a sectional view of a discharge lamp in the first embodiment.

FIG. 2 is a sectional view showing the configuration of the light source device 200. The light source device 200 includes a light source unit 210 and a discharge lamp lighting device (a discharge lamp driving device) 10. In FIG. 2, a sectional view of the light source unit 210 is shown. The light source unit 210 includes a main reflection mirror 112, a discharge lamp 90, and a sub-reflection mirror 50.

The discharge lamp lighting device 10 supplies a driving current I to the discharge lamp 90 and lights the discharge lamp 90. The main reflection mirror 112 reflects light emitted from the discharge lamp 90 toward a radiating direction D. The radiating direction D is parallel to an optical axis AX of the discharge lamp 90.

The shape of the discharge lamp 90 is a bar shape extending along the radiating direction D. One end portion of the discharge lamp 90 is represented as a first end portion 90e1. The other end portion of the discharge lamp 90 is represented as a second end portion 90e2. The material of the discharge lamp 90 is, for example, a light transmissive material such as quartz glass. The center portion of the discharge lamp 90 swells in a spherical shape. The inside of the discharge lamp 90 is a discharge space 91. In the discharge space 91, gas, which is a discharge medium, including rare gas and a metal halogen compound is encapsulated.

The distal ends of a first electrode 92 and a second electrode 93 project to the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 is a bar shape extending along the optical axis AX. In the discharge space 91, the electrode distal end portions of the first electrode 92 and the second electrode 93 are disposed to be opposed a predetermined distance apart from each other. The material of the first electrode 92 and the second electrode 93 is, for example, metal such as tungsten.

A first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is, for example, metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies a driving current I for driving the discharge lamp 90 to the first terminal 536 and the second terminal 546. As a result, arc discharge occurs between the first electrode 92 and the second electrode 93. Light (discharge light) generated by the arc discharge is radiated to all directions from a discharge position as indicated by broken line arrows.

The main reflection mirror 112 is fixed to the first end portion 90e1 of the discharge lamp 90 by a fixing member 114. The main reflection mirror 112 reflects, toward the radiating direction D, light traveling toward the opposite side of the radiating direction D in the discharge light. The shape of a reflection surface (a surface on the discharge lamp 90 side) of the main reflection mirror 112 is not particularly limited as long as the reflection surface can reflect the discharge light to the radiating direction D. For example, the shape may be a spheroid shape or a paraboloid shape. For example, when the shape of the reflection surface of the main reflection mirror 112 is formed in the paraboloid shape, the main reflection mirror 112 can convert the discharge light into light substantially parallel to the optical axis AX. Consequently, the collimating lens 305 can be omitted.

The sub-reflection mirror 50 is fixed to the second end portion 90e2 side of the discharge lamp 90 by a fixing member 522. The shape of a reflection surface (a surface on the discharge lamp 90 side) of the sub-reflection mirror 50 is a spherical surface shape that surrounds a portion on the second end portion 90e2 side of the discharge space 91. The sub-reflection mirror 50 reflects, toward the main reflection mirror 112, light traveling toward the opposite side of the disposed side of the main reflection mirror 112 in the discharge light. Consequently, it is possible to improve efficiency of use of the light radiated from the discharge space 91.

The material of the fixing members 114 and 522 is not particularly limited as long as the material is a heat resistant material that can withstand heat generation from the discharge lamp 90. The material is, for example, an inorganic adhesive. A method of fixing the disposition of the main reflection mirror 112 and the sub-reflection mirror 50 and the discharge lamp 90 is not limited to a method of fixing the main reflection mirror 112 and the sub-reflection mirror 50 to the discharge lamp 90. Any method can be adopted. For example, the discharge lamp 90 and the main reflection mirror 112 may be independently fixed to a housing (not shown in the figure) of the projector 500. The same applies to the sub-reflection mirror 50.

The circuit configuration of the projector 500 is explained below.

Figure 3:
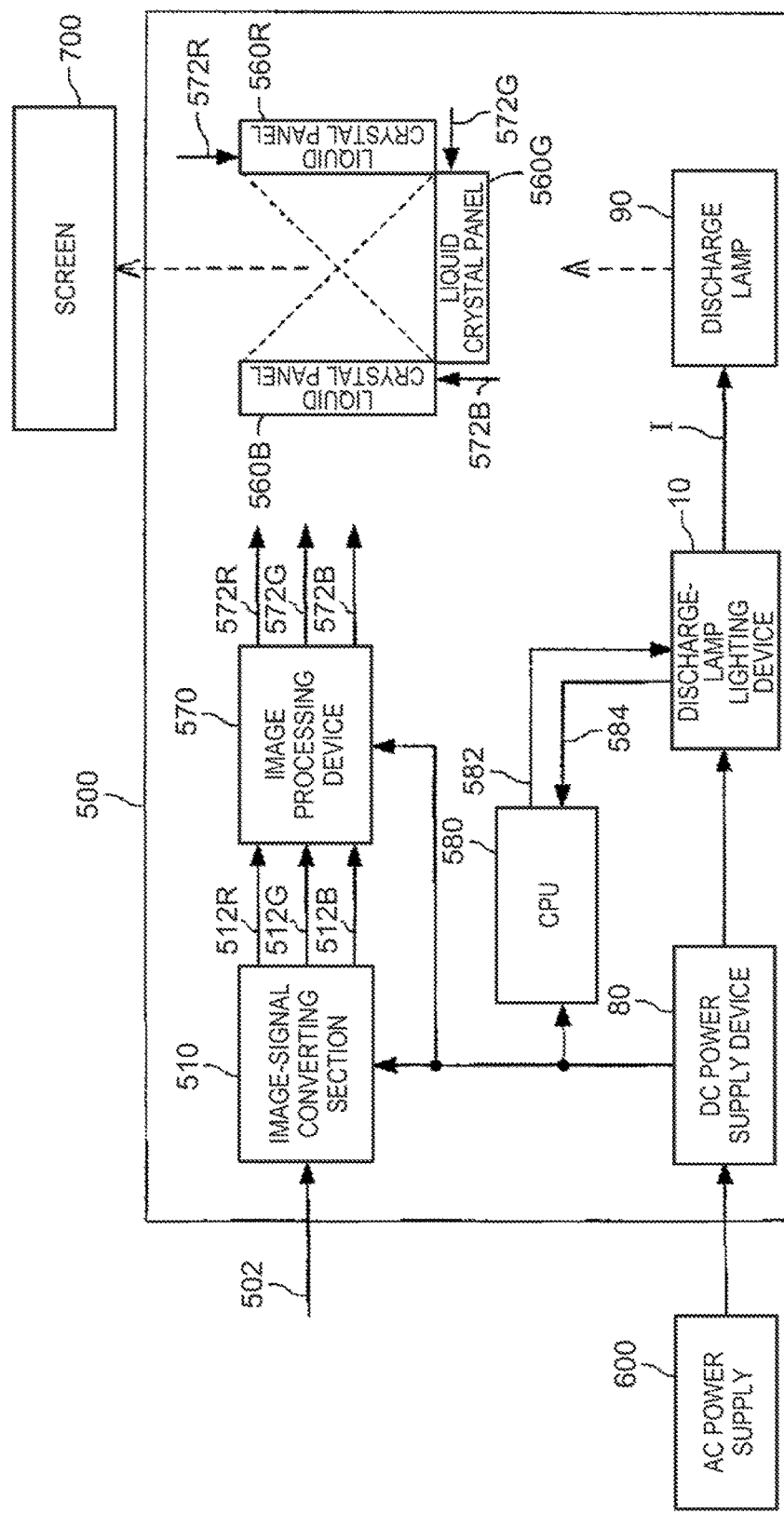
FIG. 3 is a block diagram showing various components of the projector according to the first embodiment.

FIG. 3 is a diagram showing an example of the circuit configuration of the projector 500 in this embodiment. The projector 500 includes, besides the optical systems shown in FIG. 1, an image-signal converting section 510, a direct-current power supply device 80, the liquid crystal panels 560R, 560G, and 560B, an image processing device 570, and a CPU (Central Processing Unit) 580.

The image-signal converting section 510 converts an image signal 502 (a luminance-color difference signal, an analog RGB signal, etc.) input from the outside into a digital RGB signal having a predetermined word length, generates image signals 512R, 512G, and 512B, and supplies the image signals 512R, 512G, and 512B to the image processing device 570.

The image processing device 570 performs image processing on each of the three image signals 512R, 512G, and 512B. The image processing device 570 supplies driving signals 572R, 572G, and 572B for respectively driving the liquid crystal panels 560R, 560G, and 560B to the liquid crystal panels 560R, 560G, and 560B.

The direct-current power supply device 80 converts an alternating-current voltage supplied from an external alternating-current power supply 600 into a fixed direct-current voltage. The direct-current power supply device 80 supplies the direct-current voltage to the image-signal converting section 510 and the image processing device 570 present on a secondary side of a transformer (although not shown in the figure, included in the direct-current power supply device 80) and the discharge lamp lighting device 10 present on a primary side of the transformer.

The discharge lamp lighting device 10 generates a high voltage between the electrodes of the discharge lamp 90 during a start, causes dielectric breakdown, and forms a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G, and 330B. The liquid crystal panels 560R, 560G, and 560B modulate, respectively on the basis of the driving signals 572R, 572G, and 572B, transmittances (luminances) of the color lights made incident on the liquid crystal panels 560R, 560G, and 560B via the optical systems.

The CPU 580 controls various operations from a lighting start to extinction of the projector 500. For example, in the example shown in FIG. 3, the CPU 580 outputs a lighting command and an extinction command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained below.

Figure 4:
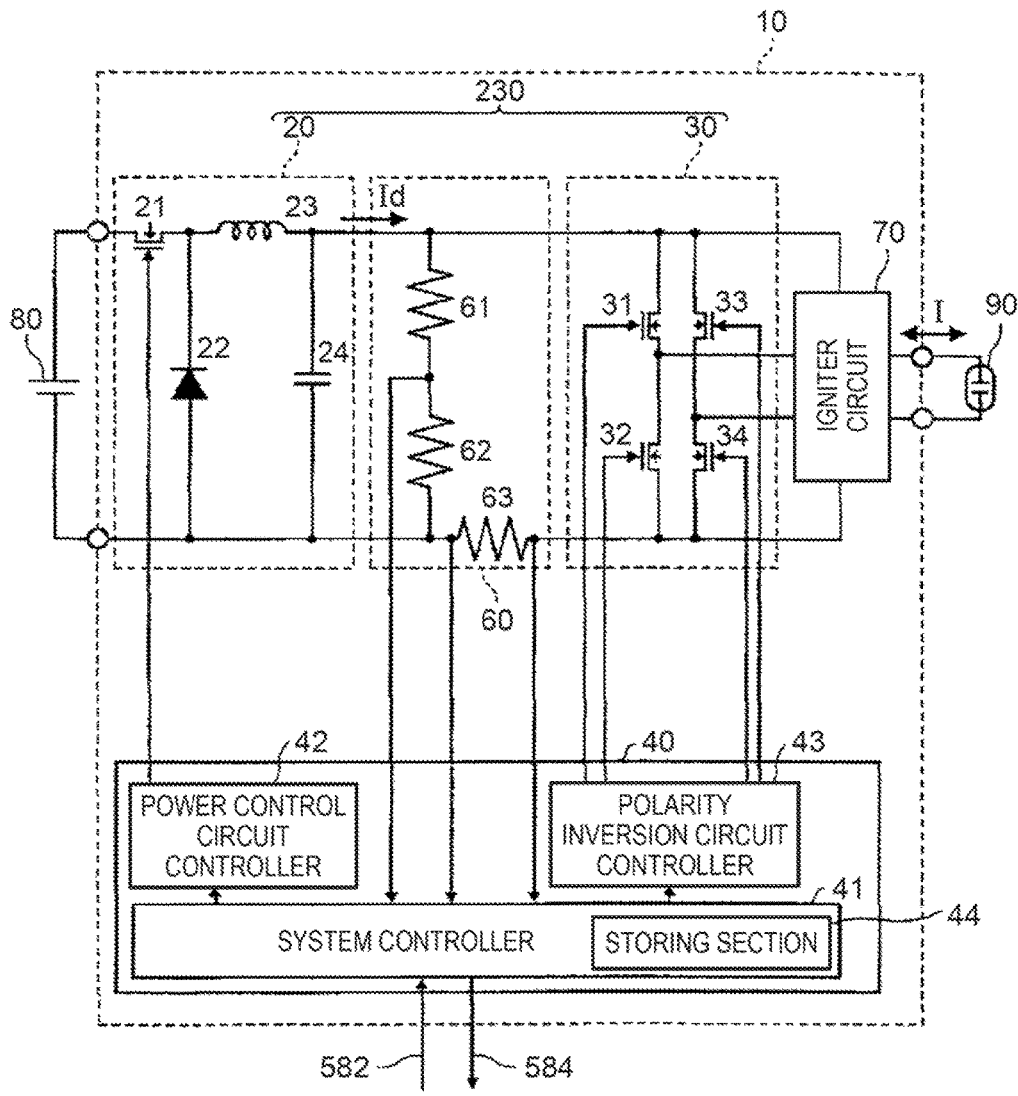
FIG. 4 is a circuit diagram of a discharge lamp lighting device in the first embodiment.

FIG. 4 is a diagram showing an example of the circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power supplied to the discharge lamp 90. In this embodiment, the power control circuit 20 is configured by a down-chopper circuit that receives a voltage from the direct-current power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the direct-current power supply device 80 and the other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the direct-current power supply device 80. A current control signal is input to a control terminal of the switch element 21 from the control section 40 explained below. ON/OFF of the switch element 21 is controlled. As the current control signal, for example, a PWM (Pulse Width Modulation) control signal may be used.

When the switch element 21 is turned on, an electric current flows to the coil 23 and energy is accumulated in the coil 23. Thereafter, when the switch element 21 is turned off, the energy accumulated in the coil 23 is discharged through a route that passes the capacitor 24 and the diode 22. As a result, the direct current Id corresponding to a rate of time in which the switch element 21 is ON is generated.

The polarity inversion circuit 30 inverts, at predetermined timing, the polarities of the direct current Id input from the power control circuit 20. Consequently, the polarity inversion circuit 30 generates the driving current I, which is a direct current continuing for a controlled time, or the driving current I, which is an alternating current having any frequency, and outputs the driving current I. In this embodiment, the polarity inversion circuit 30 is configured by an inverter bridge circuit (a full-bridge circuit).

The polarity inversion circuit 30 includes, for example, a first switch element 31, a second switch element 32, a third switch element 33, and a fourth switch element 34 configured by a transistor or the like. The polarity inversion circuit 30 includes a configuration in which the first switch element 31 and the second switch element 32 connected in series and the third switch element 33 and the fourth switch element 34 connected in series are connected to each other in parallel.

Polarity inversion control signals are respectively input to control terminals of the first switch element 31, the second switch element 32, the third switch element 33, and the fourth switch element 34 from the control section 40. ON/OFF operations of the first switch element 31, the second switch element 32, the third switch element 33, and the fourth switch element 34 are controlled on the basis of the polarity inversion control signals.

In the polarity inversion circuit 30, operation for alternating turning on and off the first and fourth switch elements 31 and 34 and the second and third switch elements 32 and 33 is repeated. Consequently, the polarities of the direct current Id output from the power control circuit 20 are alternately inverted. The polarity inversion circuit 30 generates the driving current I, which is a direct current for continuing the same polarity state for a controlled time, or the driving current I, which is an alternating current having a controlled frequency, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are ON, the second switch element 32 and the third switch element 33 are OFF and, when the first switch element 31 and the fourth switch element 34 are OFF, the second switch element 32 and the third switch element 33 are ON. Therefore, when the first switch element 31 and the fourth switch element 34 are ON, the driving current I flowing from one end of the capacitor 24 to the first switch element 31, the discharge lamp 90, and the fourth switch element 34 in this order is generated. When the second switch element 32 and the third switch element 33 are ON, the driving current I flowing from one end of the capacitor 24 to the third switch element 33, the discharge lamp 90, and the second switch element 32 in this order is generated.

In this embodiment, a combined portion of the power control circuit 20 and the polarity inversion circuit 30 corresponds to a discharge lamp driving section 230. That is, the discharge lamp driving section 230 supplies the driving current I for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control parameters such as a retention time in which the driving current I continues the same polarity, a current value of the driving current I (a power value of the driving power), and a frequency. The control section 40 performs, on the polarity inversion circuit 30, at polarity inversion timing of the driving current I, polarity inversion control for controlling the retention time in which the driving current I continues at the same polarity, the frequency of the driving current I, and the like. The control section 40 performs, on the power control circuit 20, current control for controlling a current value of the output direct current Id.

The control section 40 is capable of executing, as a control method for the discharge lamp driving section 230, first discharge lamp driving for executing first control and second control for supplying the driving current I including the direct current and the alternating current to the discharge lamp 90. In the first discharge lamp driving, the control section 40 selects, on the basis of a lamp voltage (an interelectrode voltage) Vla, the control method of one of the first control and the second control and controls the discharge lamp driving section 230. Details are explained below.

The configuration of the control section 40 is not particularly limited. In this embodiment, the control section 40 includes a system controller 41, a power control circuit controller 42, and a polarity inversion circuit controller 43. Note that a part of or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of the lamp voltage Vla and the driving current I detected by the operation detecting section 60.

In this embodiment, a storing section 44 is connected to the system controller 41.

The system controller 41 may control the power control circuit 20 and the polarity inversion circuit 30 on the basis of information stored in the storing section 44. In the storing section 44, for example, information concerning driving parameters such as the retention time in which the driving current I continues at the same polarity and a current value, a fundamental frequency, a waveform, and a modulation pattern of the driving current I may be stored. The fundamental frequency is a frequency of the driving current I supplied to the discharge lamp 90 in a steady lighting mode.

In this embodiment, in the storing section 44, a driving current waveform of the driving current I supplied to the discharge lamp 90 in each of the first control and the second control in the first discharge lamp driving, a value of a first threshold voltage Vla11 used for selection of the first control and the second control explained below, and the like are stored.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 can be realized using a dedicated circuit to perform the control explained above and various kinds of control of processing explained below. On the other hand, for example, a CPU executes a control program stored in the storing section 44, whereby the control section 40 can function as a computer and perform various kinds of control of these kinds of processing.

Figure 5:
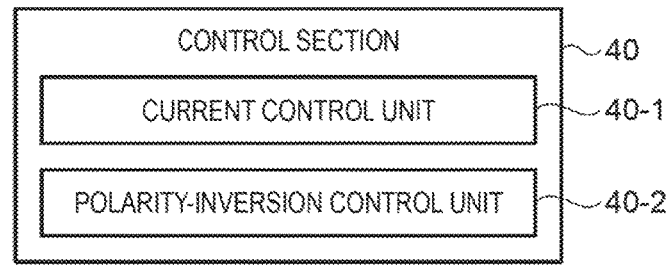
FIG. 5 is a block diagram showing a configuration example of a control section in the first embodiment.

FIG. 5 is a diagram for explaining another configuration example of the control section 40. As shown in FIG. 5, the control section 40 may be configured to function as, according to a control program, a current control unit 40-1 that controls the power control circuit 20 and a polarity-inversion control unit 40-2 that controls the polarity inversion circuit 30.

In the example shown in FIG. 4, the control section 40 is configured as a part of the discharge lamp lighting device 10. On the other hand, the CPU 580 maybe configured to perform a part of the functions of the control section 40.

In this embodiment, the operation detecting section 60 includes a voltage detecting section that detects the lamp voltage Vla of the discharge lamp 90 and outputs lamp voltage information to the control section 40. The operation detecting section 60 may include, for example, a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage Vla with a voltage divided by the first resistor 61 and the second resistor 62 connected in series to each other in parallel to the discharge lamp 90. In this embodiment, the current detecting section detects the driving current I with a voltage generated in the third resistor 63 connected in series to the discharge lamp 90.

The igniter circuit 70 operates only during a lighting start of the discharge lamp 90. The igniter circuit 70 supplies, to an interelectrode space (between the first electrode 92 and the second electrode 93) of the discharge lamp 90, a high voltage (a voltage higher than a voltage during normal lighting of the discharge lamp 90) necessary for causing dielectric breakdown in the interelectrode space (between the first electrode 92 and the second electrode 93) of the discharge lamp 90 during the lighting start of the discharge lamp 90 and forming a discharge path. In this embodiment, the igniter circuit 70 is connected in parallel to the discharge lamp 90.

Figure 6A:
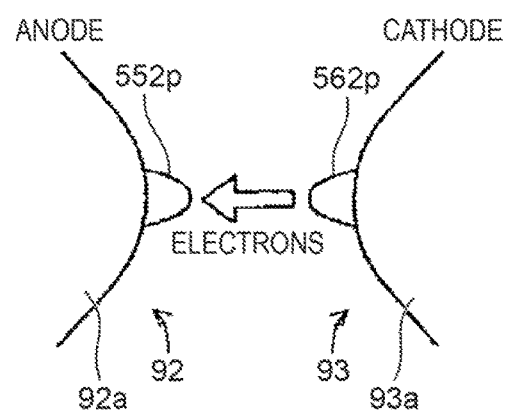
FIG. 6A is a diagram showing a state of protrusions at electrode distal ends of the discharge lamp.
Figure 6B:
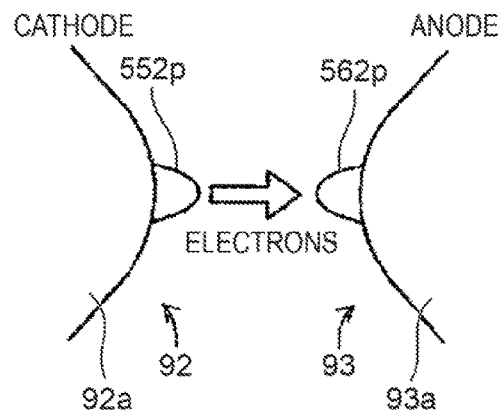
FIG. 6B is a diagram showing a state of the protrusions at the electrode distal ends of the discharge lamp.

In FIGS. 6A and 6B, the distal end portions of the first electrode 92 and the second electrode 93 are shown. Protrusions 552$p$ and 562$p$ are respectively formed at the distal ends of the first electrode 92 and the second electrode 93. The protrusion 552$p$ projects from an electrode main body 92$a$ of the first electrode 92 to the second electrode 93 side. The protrusion 562$p$ projects from an electrode main body 93$a$ of the second electrode 93 to the first electrode 92 side.

Electric discharge that occurs between the first electrode 92 and the second electrode 93 mainly occurs between the protrusion 552$p$ and the protrusion 562$p$. When the protrusions 552$p$ and 562$p$ are present as in this embodiment, compared with when protrusions are absent, it is possible to suppress movement of discharge positions (arc positions) in the first electrode 92 and the second electrode 93.

FIG. 6A shows a first polarity state in which the first electrode 92 operates as an anode and the second electrode 93 operates as a cathode. In the first polarity state, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision and the temperature of the distal end (the protrusion 552$p$) of the anode (the first electrode 92) rises.

FIG. 6B shows a second polarity state in which the first electrode 92 operates as a cathode and the second electrode 93 operates as an anode. In the second polarity state, contrary to the first polarity state, electrons move from the first electrode 92 to the second electrode 93. As a result, the temperature of the distal end (the protrusion 562$p$) of the second electrode 93 rises.

In this way, since the driving current I is supplied to the discharge lamp 90, the temperature of the anode, with which the electrons collide, rises. On the other hand, the temperature of the cathode, which emits the electrons, drops while the cathode is emitting the electrons to the anode.

An interelectrode distance between the first electrode 92 and the second electrode 93 increases according to deterioration of the protrusions 552$p$ and 562$p$. This is because the protrusions 552p and 562p are worn. When the interelectrode distance increases, since the resistance between the first electrode 92 and the second electrode 93 increases, the lamp voltage Vla increases. Therefore, it is possible to detect a change in the interelectrode distance, that is, a deterioration degree of the discharge lamp 90 by referring to the lamp voltage Vla.

Note that the first electrode 92 and the second electrode 93 have the same configuration. Therefore, in the following explanation, only the first electrode 92 is sometimes representatively explained. The protrusion 552p at the distal end of the first electrode 92 and the protrusion 562p at the distal end of the second electrode 93 have the same configuration. Therefore, in the following explanation, only the protrusion 552p is sometimes representatively explained.

The control of the discharge lamp driving section 230 by the control section 40 in this embodiment is explained.

Figure 7:
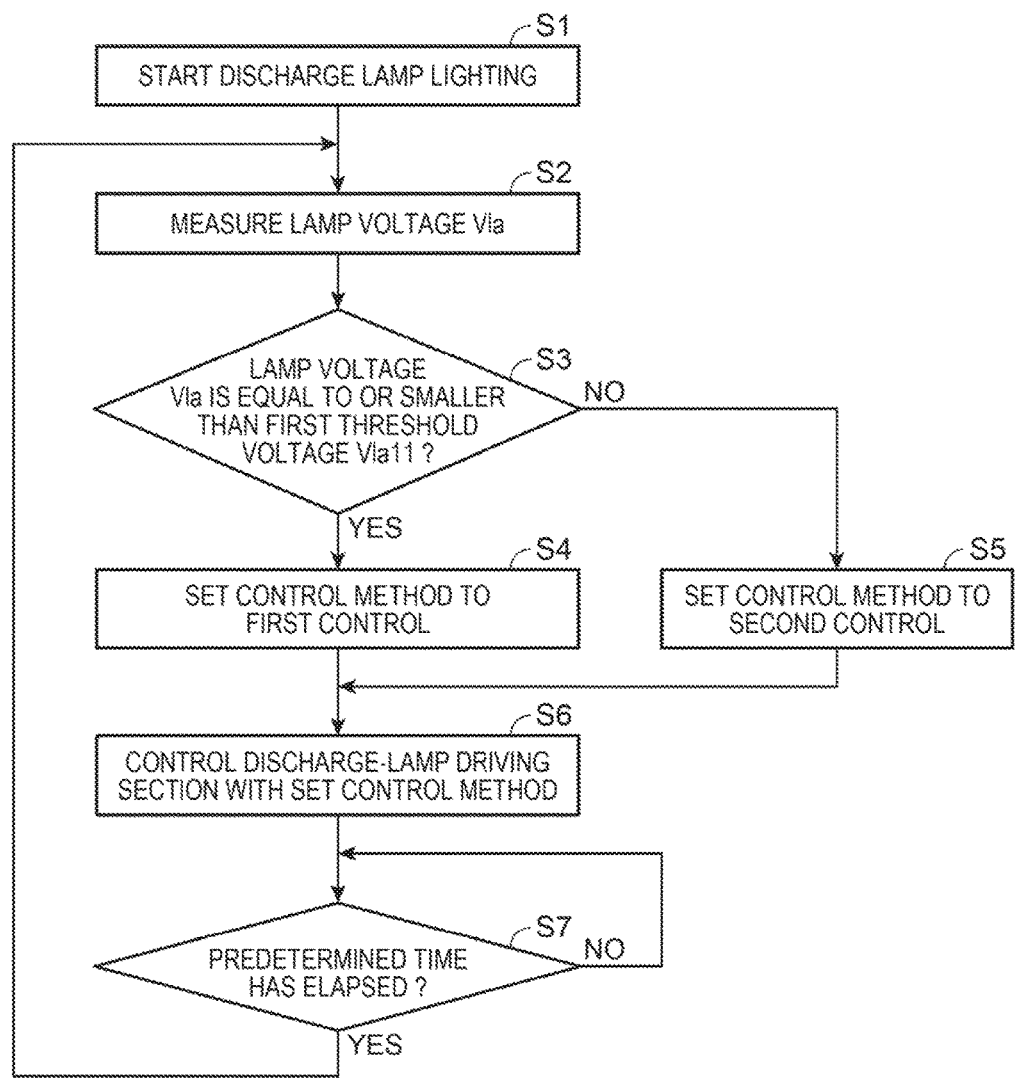
FIG. 7 is a flowchart for explaining an example of a control procedure of a discharge lamp driving section by the control section in the first embodiment.

FIG. 7 is a flowchart for explaining a procedure of the control of the discharge lamp driving section 230 by the control section 40 in this embodiment. In FIG. 7, the discharge lamp 90 is driven by the first discharge lamp driving.

In the first discharge lamp driving, after starting lighting of the discharge lamp 90 (step S1), the control section 40 measures the lamp voltage Vla with the voltage detecting section of the operation detecting section 60 (step S2). The control section 40 determines whether the measured lamp voltage Vla is equal to or smaller than the first threshold voltage Vla11 (step S3). If the measured lamp voltage Vla is equal to or smaller than the first threshold voltage Vla11 (YES in step S3), the control section 40 sets the control method for the discharge lamp driving section 230 to the first control (step S4). If the measured lamp voltage Vla is larger than the first threshold voltage Vla11 (NO in step S3), the control section 40 sets the control method for the discharge lamp driving section 230 to the second control (step S5). The control section 40 controls the discharge lamp driving section 230 with the set control method (step S6).

In the first control and the second control, the driving current I including the direct current and the alternating current is supplied to the discharge lamp 90. A rate of the direct current in the second control is larger than a rate of the direct current in the first control.

FIGS. 8A to 8C and FIGS. 9A to 9C are diagrams showing examples of portions of driving current waveforms in the first control and the second control. In FIGS. 8A to 8C and FIGS. 9A to 9C, the ordinate indicates the driving current I and the abscissa indicates time T. The driving current I is shown as positive in a first polarization state and is shown as negative in a second polarization state.

Waveforms shown in FIGS. 8A to 8C and FIGS. 9A to 9C are respectively driving current waveforms per unit time ta. In the following explanation, the portion of the driving current waveform shown in each of FIGS. 8A to 8C and FIGS. 9A to 9C is referred to as unit waveform.

In this embodiment, the driving current waveforms in the first control and the second control are formed by combining unit waveforms shown in FIGS. 8A to 8C and FIGS. 9A to 9C.

Figure 8A:
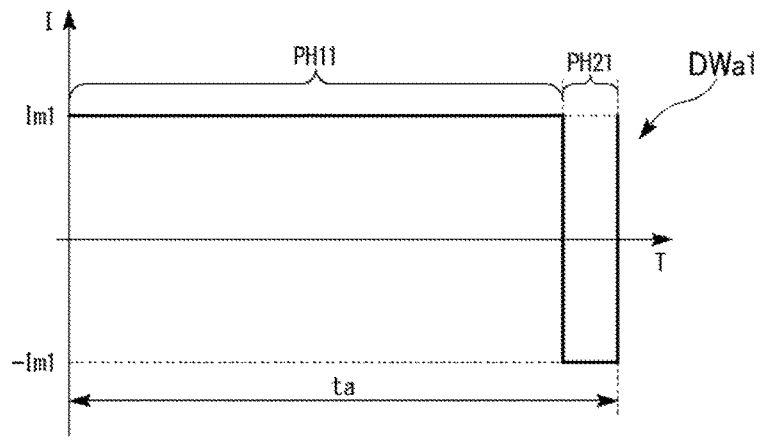
FIG. 8A is a diagram showing an example of a driving current waveform in the first embodiment.

A unit waveform DWa1 shown in FIG. 8A includes a direct current period PH11 in which a direct current is supplied to the discharge lamp 90 and an opposite polarity period PH21 in which an electric current with polarity opposite to polarity in the direct current period PH11 is supplied to the discharge lamp 90.

In the direct current period PH11, the driving current I with first polarity having a fixed current value Im is supplied to the discharge lamp 90. In the opposite polarity period PH21, the driving current I with second polarity having a fixed current value −Im is supplied to the discharge lamp 90.

Figure 8B:
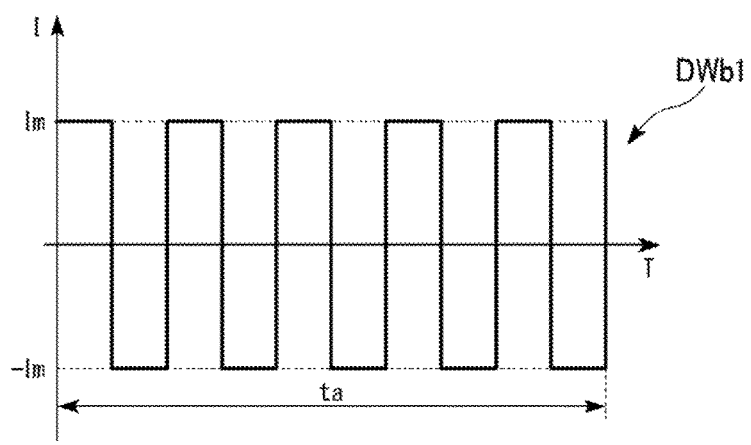
FIG. 8B is a diagram showing an example of a driving current waveform in the first embodiment.
Figure 8C:
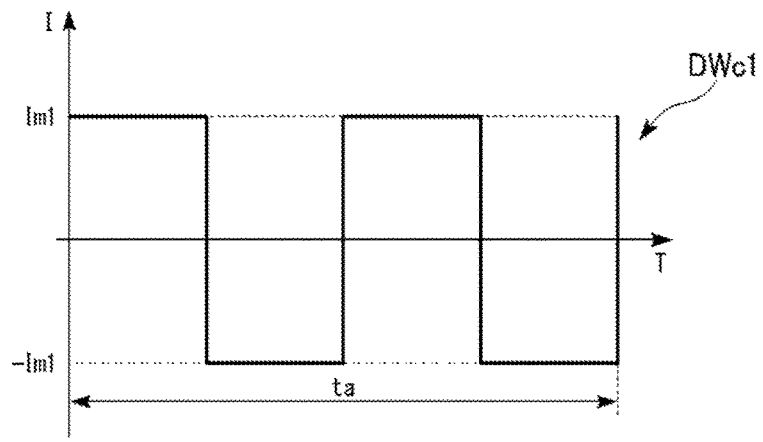
FIG. 8C is a diagram showing an example of a driving current waveform in the first embodiment.

A unit waveform DWb1 shown in FIG. 8B and a unit waveform DWc1 shown in FIG. 8C are current waveforms of an alternating current, the polarity of which is inverted a plurality of times between a current value Im1 and a current value −Im1. A frequency (a second frequency) of an alternating current (a second alternating current) in the unit waveform DWc1 is lower than a frequency (a first frequency) of an alternating current (a first alternating current) in the unit waveform DWb1. In other words, an alternating current in the first control and an alternating current in the second control include the first alternating current having the first frequency and the second alternation current having the second frequency lower than the first frequency.

The frequency (the first frequency) of the alternating current in the unit waveform DWb1 is, for example, equal to or higher than 500 Hz. The frequency (the second frequency) of the alternating current in the unit waveform DWc1 is, for example, equal to or lower than 280 Hz. By setting the frequencies of the alternating currents in the unit waveforms DWb1 and DWc1 in this way, it is easy to maintain the protrusion 552p of the first electrode 92 in a stable shape.

Figure 9A:
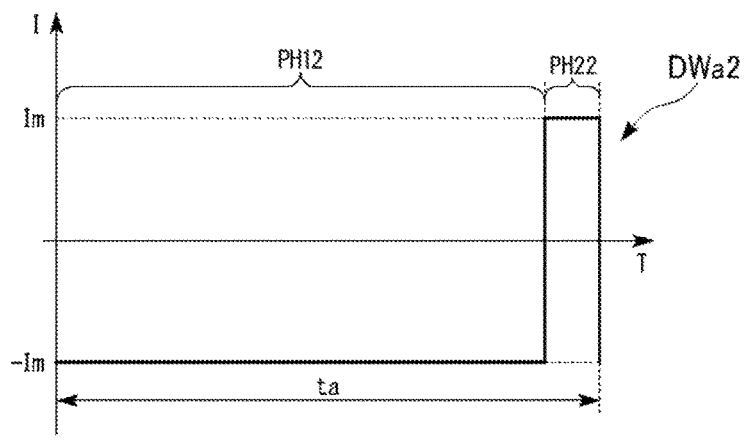
FIG. 9A is a diagram showing an example of a driving current waveform in the first embodiment.

A unit waveform DWa2 shown in FIG. 9A includes a direct current period PH12 in which a direct current is supplied to the discharge lamp 90 and an opposite polarity period PH22 in which an electric current with polarity opposite to polarity in the direct current period PH12 is supplied to the discharge lamp 90. The unit waveform DWa2 is the same as the unit waveform DWa1 except that polarity is inverted.

Figure 9B:
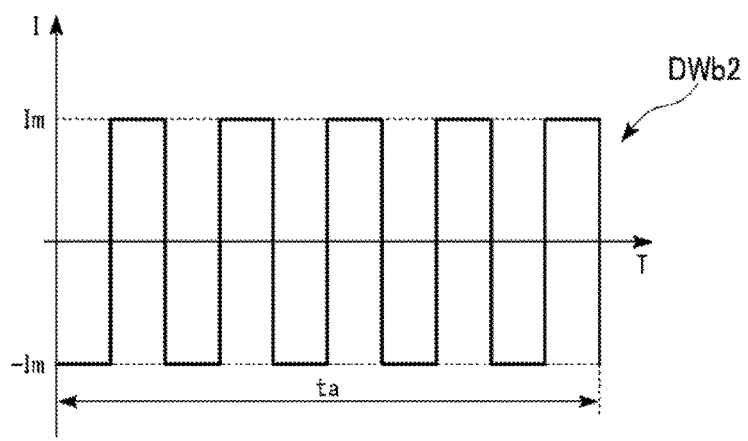
FIG. 9B is a diagram showing an example of a driving current waveform in the first embodiment.

A unit waveform DWb2 shown in FIG. 9B is the same as the unit waveform DWb1 except that polarity is inverted.

Figure 9C:
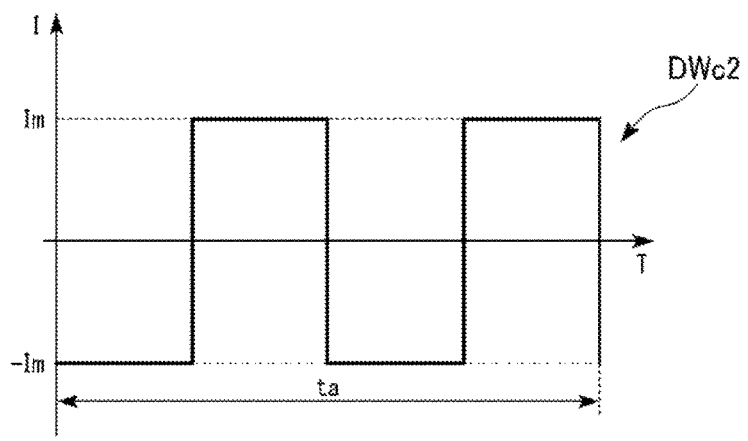
FIG. 9C is a diagram showing an example of a driving current waveform in the first embodiment.

A unit waveform DWc2 shown in FIG. 9C is the same as the unit waveform DWc1 except that polarity is inverted.

Note that, in the following explanation, an alternating current in the unit waveforms DWb1 and DWb2 is referred to as first alternating current. A frequency of the alternating current in the unit waveforms DWb1 and DWb2 is referred to as first frequency. An alternating current in the unit waveforms DWc1 and DWc2 is referred to as second alternating current. A frequency of the alternating current in the unit waveforms DWc1 and DWc2 is referred to as second frequency.

In the first control in this embodiment, a cycle C1 in which the unit waveform DWa1, the unit waveform DWb1, the unit waveform DWc1, the unit waveform DWa2, the unit waveform DWb2, and the unit waveform DWc2 are arranged in this order is repeated. Each of the unit waveforms is provided once or a plurality of times in one cycle C1.

In the second control in this embodiment, as in the first control, a cycle C2 in which the unit waveform DWa1, the unit waveform DWb1, the unit waveform DWc1, the unit waveform DWa2, the unit waveform DWb2, and the unit waveform DWc2 are arranged in this order is repeated. Each of the unit waveforms is provided once or a plurality of times in one cycle C2.

An example of the cycle C1 of the first control and an example of the cycle C2 of the second control in the first discharge lamp driving are shown in Table 1.

TABLE 1

|  |  | DWa1 | DWb1 | DWc1 | DWa2 | DWb2 | DWc2 |
|---|---|---|---|---|---|---|---|
|  |  | Cycle C1 | | | | | |
| First discharge lamp driving | First control | 1 | 1 | 1000 | 1 | 1 | 1000 |
|  |  | Cycle C2 | | | | | |
|  | Second control | 4 | 12 | 1 | 4 | 12 | 1 |

In the examples shown in Table 1, in the cycle C1, in the following order, the unit waveform DWa1 is provided once, the unit waveform DWb1 is provided once, the unit waveform DWc1 is continuously provided 1000 times, the unit waveform DWa2 is provided once, the unit waveform DWb2 is provided once, and the unit waveform DWc2 is continuously provided 1000 times.

In the examples shown in Table 1, in the cycle C2, in the following order, the unit waveform DWa1 is continuously provided four times, the unit waveform DWb1 is continuously provided twelve times, the unit waveform DWc1 is provided once, the unit waveform DWa2 is continuously provided four times, the unit waveform DWb2 is continuously provided twelve times, and the unit waveform DWc2 is provided once.

As shown in Table 1, a rate of the unit waveforms DWa1 and DWa2 in the cycle C2 of the second control is larger than a rate of the unit waveforms DWa1 and DWa2 in the cycle C1 of the first control. In other words, a rate of the direct current, that is, the direct current periods PH11 and PH12 in the second control is larger than a rate of the direct current, that is, the direct current periods PH11 and PH12 in the first control.

Note that, in this specification, the rate of the direct current in the first control or the second control is a ratio of time in which the direct current is supplied to the discharge lamp 90 to an execution time in which the first control or the second control is executed.

Referring back to FIG. 7, the control section 40 determines whether a predetermined time has elapsed after the control section 40 started to control the discharge lamp driving section 230 with the set control method (step S7). If the predetermined time has not elapsed (NO in step S7), the control section 40 continues to control the discharge lamp driving section 230 with the set control method. If the predetermined time has elapsed (YES in step S7), the control section 40 measures the lamp voltage Vla again (step S2) and performs setting of the control method (steps S3 to S5).

That is, in this embodiment, predetermined setting timing for measuring the lamp voltage Vla (step S2) and setting the control method for the discharge lamp driving section 230 (steps S3 to S5) is provided for each predetermined time.

The predetermined time from the predetermined setting timing to the next predetermined setting timing is desirably set to 60 s (seconds) or more and more desirably set to approximately 300 s (seconds). By setting the predetermined time in this way, it is possible to execute each of the first control and the second control for a relatively long time. It is easy to maintain the protrusion 552p of the first electrode 92 in a stable state.

The control by the control section 40 is more specifically explained.

When the lamp voltage Vla in an initial period of the discharge lamp 90 is 65 V, the first threshold voltage Vla11 is set to, for example, 70 V. In a lighting initial period of the discharge lamp 90, the lamp voltage Vla is equal to or smaller than the first threshold voltage Vla11. Therefore, in the first discharge lamp driving, the control section 40 sets the control method for the discharge lamp driving section 230 to the first control and controls the discharge lamp driving section 230 with the first control.

When the discharge lamp 90 is driven for a long time by the first control, the discharge lamp 90 is deteriorated, the protrusion 552p is less easily formed, and the interelectrode distance increases. Consequently, the lamp voltage Vla rises. When the lamp voltage Vla rises to be larger than the first threshold voltage Vla11, at predetermined setting timing, the control section 40 changes the control method for the discharge lamp driving section 230 from the first control to the second control.

The rate of the direct current in the second control is larger than the rate of the direct current in the first control. Therefore, in the second control, the first electrode 92 easily melts. Compared with the first control, the protrusion 552p is easily formed. Consequently, the protrusion 552p grows, the interelectrode distance decreases, and the lamp voltage Vla drops. When the lamp voltage Vla drops to be equal to or smaller than the first threshold voltage Vla11, at predetermined setting timing, the control section 40 sets the control method for the discharge lamp driving section 230 to the first control again.

The setting of the first control and the second control is repeated, whereby the lamp voltage Vla is maintained within a fixed range centering on the first threshold voltage Vla11 while repeating a rise and a drop across the first threshold voltage Vla11.

The control by the control section 40 can be represented as a discharge lamp driving method. That is, the discharge lamp driving method according to this embodiment is a discharge lamp driving method for supplying the driving current I to the discharge lamp 90 and driving the discharge lamp 90. The discharge lamp driving method includes first discharge lamp driving for executing first control and second control for supplying the driving current I including a direct current and an alternating current to the discharge lamp 90. The discharge lamp driving method includes, in the first discharge lamp driving, executing the first control when the lamp voltage Vla is equal to or smaller than the first threshold voltage Vla11 at predetermined setting timing and executing the second control when the lamp voltage Vla is larger than the first threshold voltage Vla11 at the predetermined setting timing. The rate of the direct current in the second control is larger than the rate of the direct current in the first control.

According to this embodiment, the control section 40 is capable of executing the first discharge lamp driving in which the first control and the second control having a larger rate of the direct current than the first control are executed.

The control section 40 sets the first control and the second control on the basis of the lamp voltage Vla and controls the discharge lamp driving section 230. Therefore, according to this embodiment, it is possible to improve the life of the discharge lamp 90. This is explained below in detail.

For example, when a driving current obtained by combining alternating currents and direct currents having a plurality of frequencies is supplied to the discharge lamp 90, the protrusion 552p is formed in an initial stage. However, according to deterioration of the discharge lamp 90 due to use for a long time, the protrusion 552p gradually becomes less easily formed. A stable electrode shape sometimes cannot be maintained.

Figure 10A:
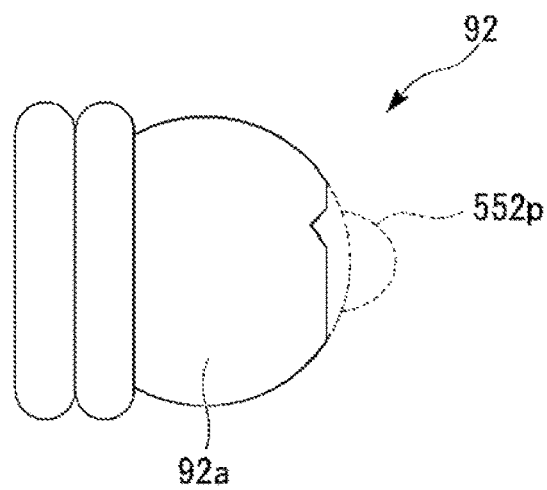
FIG. 10A is a diagram showing a change of an electrode of the discharge lamp.
Figure 10B:
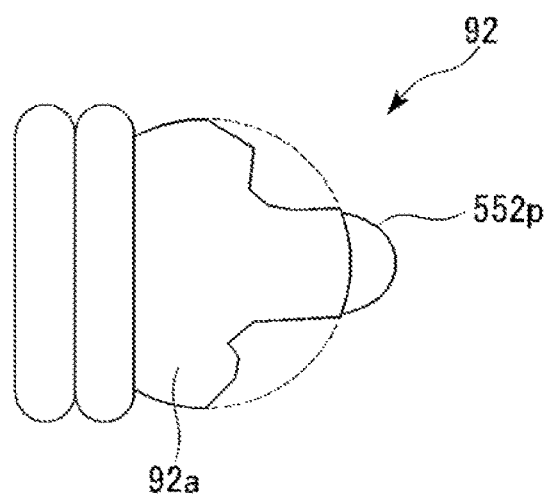
FIG. 10B is a diagram showing a change of the electrode of the discharge lamp.
Figure 10C:
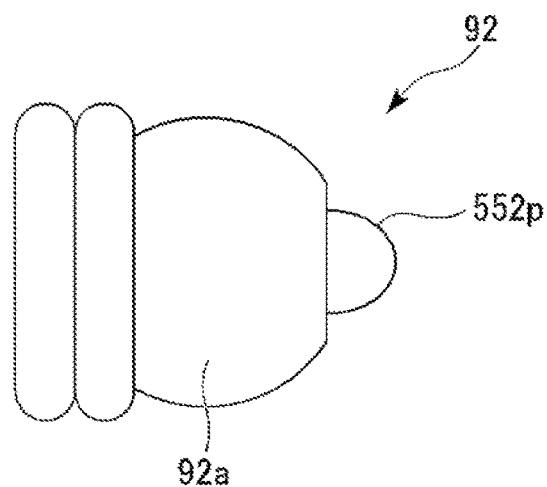
FIG. 10C is a diagram showing a change of the electrode of the discharge lamp.

FIGS. 10A to 10C are diagrams showing changes of the first electrode 92 of the discharge lamp 90. FIG. 10A is a diagram showing the first electrode 92 at the time when the discharge lamp 90 is driven for a long time using only the first control. FIG. 10B is a diagram showing the first electrode 92 at the time when the discharge lamp 90 is driven for a long time using only the second control. FIG. 10C is a diagram showing the first electrode 92 at the time when the discharge lamp 90 is driven for a long time by appropriately setting the first control and the second control as explained above, that is, when the discharge lamp 90 is driven for a long time by the first discharge lamp driving.

As shown in FIG. 10A, for example, when the discharge lamp driving section 230 continues to be controlled for a long time using the first control, the protrusion 552p of the first electrode 92 disappears. The distal end of the electrode main body 92a changes to a flat shape.

On the other hand, in the second control, the rate of the direct current is large compared with the first control. Therefore, the first electrode 92 easily melts and the protrusion 552p easily grows compared with the first control. However, as shown in FIG. 10B, when the discharge lamp driving section 230 continues to be controlled for a long time using the second control, the protrusion 552p of the first electrode 92 is formed. However, the electrode main body 92a is worn and thinned.

In this way, when only one control method, for example, the control method of one of the first control and the second control is used, the discharge lamp 90 is driven for a long time and deteriorated. Therefore, the shape of the first electrode 92 becomes unstable. As a result, the life of the discharge lamp 90 sometimes cannot be sufficiently increased.

On the other hand, according to this embodiment, the first control and the second control are set as appropriate according to whether the lamp voltage Vla is equal to or smaller than the first threshold voltage Vla11. The first control and the second control are alternately repeated. Therefore, in this embodiment, as shown in FIG. 10C, the protrusion 552p is formed by the second control at the distal end of the electrode main body 92a planarized by the first control. Consequently, according to this embodiment, even when the discharge lamp 90 is driven for a long time, it is possible to stably maintain the shape of the first electrode 92.

Consequently, according to this embodiment, it is possible to stably maintain the shape of the protrusion 552p of the first electrode 92. As explained above, the lamp voltage Vla is easily maintained for a long time within the fixed range centering on the first threshold voltage Vla11. As a result, according to this embodiment, it is possible to increase the life of the discharge lamp 90.

For example, when driving power supplied to the discharge lamp 90 changes, for example, in a projector adapted to 3D, the discharge lamp 90 is particularly easily deteriorated. Therefore, the effect of this embodiment is particularly large, for example, when the driving power supplied to the discharge lamp 90 changes.

According to this embodiment, the predetermined setting timing when the first control and the second control are set is provided for each predetermined time. Therefore, for example, even when the lamp voltage Vla drops to be equal to or smaller than the first threshold voltage Vla11 immediately after the first control is switched to the second control, the discharge lamp 90 is driven by the second control until the predetermined time elapses after the first control is switched to the second control. Consequently, it is possible to alternately execute the first control and the second control for a certain degree of time. Therefore, it is easy to maintain the shape of the first electrode 92 in a stable shape. Therefore, according to this embodiment, it is possible to further increase the life of the discharge lamp 90.

Note that, in this embodiment, a configuration and a method explained below may be adopted.

In this embodiment, the predetermined setting timing when the control method is set is provided once every time a power supply of the projector 500 is turned on. In this case, in one period from ON to OFF of the power supply of the projector 500, the discharge lamp driving section 230 is controlled by one of the first control and the second control.

In this embodiment, the control section 40 may adjust, on the basis of a value of the first threshold voltage Vla11, a rate of the unit waveforms DWb1 and DWb2, that is, the first alternating current in the first control and a rate of the unit waveforms DWc1 and DWc2, that is, the second alternating current in the first control.

Specifically, when the first threshold voltage Vla11 is equal to or smaller than a predetermined value, as shown in Table 1, the control section 40 sets the rate of the unit waveforms DWc1 and DWc2 larger than the rate of the unit waveforms DWb1 and DWb2. When the first threshold voltage Vla11 is larger than the predetermined value, the control section 40 sets the rate of the unit waveforms DWb1 and DWb2 larger than the rate of the unit waveforms DWc1 and DWc2. The predetermined value is, for example, a value of approximately +5 V with respect to the lamp voltage Vla in the initial period.

The example of the first control shown in Table 1 is, for example, an example at the time when the first threshold voltage Vla11 is equal to or smaller than the predetermined value. On the other hand, an example of the first control at the time when the first threshold voltage Vla11 is larger than the predetermined value is shown in Table 2.

TABLE 2

| | Cycle C12 | | | | | |
|---|---|---|---|---|---|---|
| | DWa1 | DWb1 | DWc1 | DWa2 | DWb2 | DWc2 |
| First control | 1 | 1000 | 1 | 1 | 1000 | 1 |

In the example shown in Table 2, in a cycle C12 of the first control, in the following order, the unit waveform DWa1 is provided once, the unit waveform DWb1 is continuously provided 1000 times, the unit waveform DWc1 is provided once, the unit waveform DWa2 is provided once, the unit waveform DWb2 is continuously provided 1000 times, and the unit waveform DWc2 is provided once.

As explained above, the first control and the second control are alternately repeated, whereby the lamp voltage Vla is maintained within the fixed range centering on the first threshold voltage Vla11. Therefore, when the first threshold voltage Vla11 is relatively small, the maintained lamp voltage Vla is relatively small. That is, the first electrode 92 of the discharge lamp 90 is maintained in a state in which a deterioration degree is relatively small. In this case, it is likely that the protrusion 552p excessively grows in the first control. It is likely that the shape of the first electrode 92 of the discharge lamp 90 cannot be stably maintained.

On the other hand, with this configuration, when the first threshold voltage Vla11 is relatively small, that is, when the first threshold voltage Vla11 is equal to or smaller than the predetermined value, in the cycle C1 of the first control illustrated in Table 1, the rate of the unit waveforms DWc1 and DWc2 is set larger than the rate of the unit waveforms DWb1 and DWb2. An alternating current having a low frequency gives a large heat load to the first electrode 92. The protrusion 552p is easily changed to a melted state. Therefore, by setting the rate of the unit waveforms DWc1 and DWc2, which have a frequency lower than the frequency of the unit waveforms DWb1 and DWb2, larger than the rate of the unit waveforms DWb1 and DWb2, it is possible to suppress the protrusion 552p from excessively growing.

On the other hand, when the first threshold voltage Vla11 is relatively large, the maintained lamp voltage Vla is relatively large. That is, the first electrode 92 of the discharge lamp 90 is maintained in a state in which a deterioration degree is relatively large. In this case, the deterioration of the first electrode 92 easily worsens. It is likely that the first electrode 92 is excessively worn.

On the other hand, with this configuration, when the first threshold voltage Vla11 is relatively large, that is, larger than the predetermined value, in the cycle C12 of the first control illustrated in Table 2, the rate of the unit waveforms DWb1 and DWb2 is set larger than the rate of the unit waveforms DWc1 and DWc2. Therefore, by setting the rate of the unit waveforms DWb1 and DWb2, which have a frequency higher than the frequency of the unit waveforms DWc1 and DWc2, larger than the rate of the unit waveforms DWc1 and DWc2, it is possible to suppress the protrusion 552p from being excessively worn.

The effect by this configuration is larger when the frequency (the first frequency) of the unit waveforms DWb1 and DWb2 is set to 500 Hz or more and the frequency (the second frequency) of the unit waveforms DWc1 and DWc2 is set to 280 Hz or less.

In the above explanation, the driving current waveform in the first control and the second control is formed by the two kinds of alternating currents having a frequency different from the frequency of the direct current. However, the driving current waveform is not limited to this. In this embodiment, the alternating current forming the driving current waveform in the first control and the second control maybe one kind or may include three or more kinds of alternating currents having frequencies different from one another. In this embodiment, the direct current forming the driving current waveform in the first control and the second control may be two or more kinds. The two or more kinds of direct currents include two or more kinds of direct currents having absolute values of current values supplied to the discharge lamp 90.

Second Embodiment

A second embodiment is different from the first embodiment in that driving is switched between first discharge lamp driving and fourth discharge lamp driving. Note that, explanation of components same as the components in the first embodiment is sometimes omitted by, for example, adding the same reference numerals and signs to the components as appropriate.

In this embodiment, the control section 40 is capable of executing a plurality of kinds of discharge lamp driving in addition to the first discharge lamp driving. The control section 40 is capable of executing second discharge lamp driving for executing third control and fourth control as a control method for the discharge lamp driving section 230. The control section 40 is capable of executing third discharge lamp driving for executing fifth control and sixth control as the control method for the discharge lamp driving section 230. The control section 40 is capable of executing fourth discharge lamp driving for executing seventh control and eighth control as the control method for the discharge lamp driving section 230. The third control to the eighth control are respectively control methods for supplying the driving current I including a direct current and an alternating current to the discharge lamp 90. In this embodiment, the control section 40 shifts the driving of the discharge lamp 90 from the first discharge lamp driving to the fourth discharge lamp driving in order on the basis of the lamp voltage (the interelectrode voltage) Vla and controls the discharge lamp driving section 230. Details are explained below.

In this embodiment, in the storing section 44, for example, driving current waveforms of the driving current I supplied to the discharge lamp 90 in the kinds of discharge lamp driving, a value of a shift voltage used for determination of the shift of the discharge lamp driving, and a value of a threshold voltage used for switching of a control method in the kinds of discharge lamp driving are stored.

The control of the discharge lamp driving section 230 by the control section 40 in this embodiment is explained below.

First, the shift of the driving of the discharge lamp 90 in this embodiment is explained.

Figure 11:
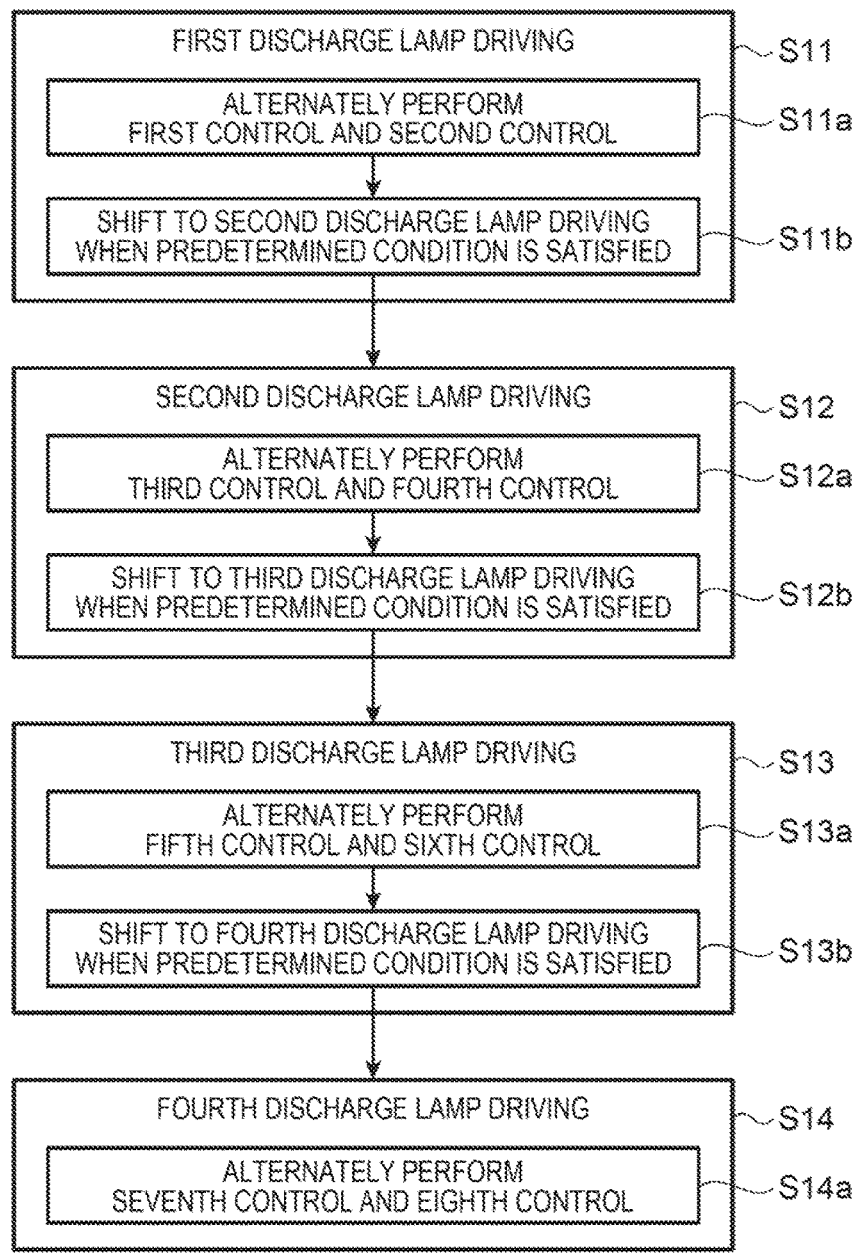
FIG. 11 is a flowchart for explaining an example of a shift procedure of discharge lamp driving by a control section in a second embodiment.

FIG. 11 is a flowchart for explaining an example of a shift procedure of the discharge lamp driving by the control section 40 in this embodiment.

As shown in FIG. 11, the control section 40 executes the first discharge lamp driving in a lighting initial period of the discharge lamp 90 (step S11). In the first discharge lamp driving, the first control and the second control are alternately performed (step S11a). When a predetermined condition is satisfied, the control section 40 shifts the driving of the discharge lamp 90 from the first discharge lamp driving to the second discharge lamp driving (step S11b).

In the second discharge lamp driving (step S12), the third control and the fourth control are alternately performed (step S12a). When the predetermined condition is satisfied, the control section 40 shifts the driving of the discharge lamp 90 from the second discharge lamp driving to the third discharge lamp driving (step S12b).

In the third discharge lamp driving (step S13), the fifth control and the sixth control are alternately performed (step S13a). When the predetermined condition is satisfied, the control section 40 shifts the driving of the discharge lamp 90 from the third discharge lamp driving to the fourth discharge lamp driving (step S13b).

In the fourth discharge lamp driving (step S14), the seventh control and the eighth control are alternately performed (step S14a).

As explained above, in this embodiment, the control section 40 shifts the first discharge lamp driving to the fourth discharge lamp driving in order and drives the discharge lamp 90.

The kinds of discharge lamp driving are explained in detail below.

Figure 12:
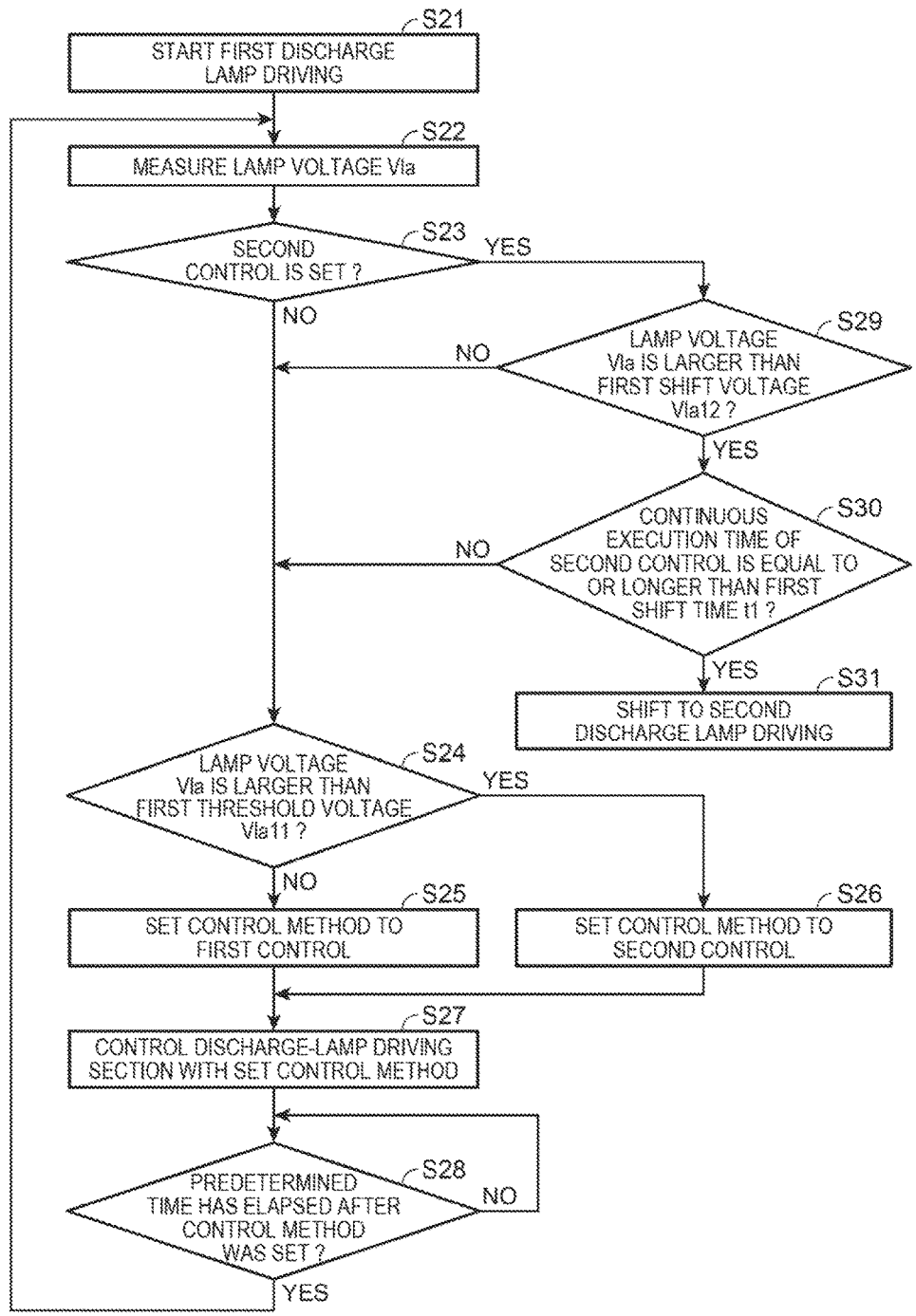
FIG. 12 is a flowchart for explaining an example of a control procedure of the control section in first discharge lamp driving in the second embodiment.

FIG. 12 is a flowchart for explaining an example of a control procedure of the control section 40 in the first discharge lamp driving.

As shown in FIG. 12, after starting the first discharge lamp driving (step S21), the control section 40 measures the lamp voltage Vla with the voltage detecting section of the operation detecting section 60 (step S22). The control section 40 determines whether the second control is set as the control method (step S23). If the second control is not set as the control method (NO in step S23), the control section 40 determines whether the measured lamp voltage Vla is larger than the first threshold voltage Vla11 (step S24).

If the measured lamp voltage Vla is equal to or smaller than the first threshold voltage Vla11 (NO in step S24), the control section 40 sets the control method for the discharge lamp driving section 230 to the first control (step S25). If the measured lamp voltage Vla is larger than the first threshold voltage Vla11 (YES in step S24), the control section 40 sets the control method for the discharge lamp driving section 230 to the second control (step S26). The control section 40 controls the discharge lamp driving section 230 with the set control method (step S27).

In the first control and the second control, the driving current I including the direct current and the alternating current is supplied to the discharge lamp 90. A rate of the direct current in the second control is larger than a rate of the direct current in the first control. The first control and the second control are explained in detail in a later stage.

The control section 40 determines whether a predetermined time has elapsed after the control section 40 started to control the discharge lamp driving section 230 with the set control method (step S28). If the predetermined time has not elapsed (NO in step S28), the control section 40 continues to control the discharge lamp driving section 230 with the set control method. If the predetermined time has elapsed (YES in step S28), the control section 40 measures the lamp voltage Vla again (step S22) and performs determination same as the determination explained above.

That is, in this embodiment, predetermined setting timing for measuring the lamp voltage Vla (step S22) and setting the control method for the discharge lamp driving section 230 (steps S24 to S26) is provided for each predetermined time.

The predetermined time from the predetermined setting timing to the next predetermined setting timing is desirably set to 60 s (seconds) or more and more desirably set to approximately 300 s (seconds). By setting the predetermined time in this way, it is possible to execute each of the first control and the second control for a relatively long time. It is easy to maintain the protrusion 552p of the first electrode 92 in a stable state.

If the second control is set as the control method in step S23 (YES in step S23), the control section 40 determines whether to shift to the second discharge lamp driving.

First, the control section 40 determines whether the lamp voltage Vla is larger than a first shift voltage Vla12 (step S29). The first shift voltage Vla12 is set to the first threshold voltage Vla11 or more. In this embodiment, the first shift voltage Vla12 is, for example, larger than the first threshold voltage Vla11 and smaller than a second threshold voltage Vla21 explained below.

If the lamp voltage Vla is larger than the first shift voltage Vla12 (YES in step S29), the control section 40 determines whether a continuous execution time of the second control is equal to or longer than a first shift time t1 (step S30). The first shift time t1 is set to, for example, approximately 20 minutes.

Note that, in this specification, the continuous execution time includes a total of time in which, after one control method is set, the set one control method is continuously executed without being switched to another control method. That is, for example, if the control method is not switched to another control method, even when extinction of the discharge lamp 90 is intervened between the control methods, an execution time of one control method executed before and after the extinction of the discharge lamp 90 is accumulated as a continuous execution time.

Specifically, for example, when the second control is set, the discharge lamp 90 is extinguished. In this case, when the second control is executed without intervention of another kind of control after the discharge lamp 90 is lit again, a continuous execution time of the second control can be a cumulative time obtained by adding up time in which the second control is executed before the extinction of the discharge lamp 90 and time in which the second control is executed after the discharge lamp 90 is lit again.

If the continuous execution time of the second control is equal to or longer than the first shift time t1 (YES in step S30), the control section 40 shifts the driving of the discharge lamp 90 from the first discharge lamp driving to the second discharge lamp driving (step S31).

Note that, if the lamp voltage Vla is equal to or smaller than the first shift voltage Vla12 in step S29 (NO in step S29) or if the continuous execution time of the second control is shorter than the first shift time t1 in step S30 (NO in step S30), the control section 40 compares the lamp voltage Vla with the first threshold voltage Vla11 (step S24) and performs setting of the control method (steps S25 and S26).

As explained above, in the second control of the first discharge lamp driving, when the lamp voltage Vla is larger than the first shift voltage Vla12 equal to or larger than the first threshold voltage Vla11 and the continuous execution time of the second control is equal to or longer than the first shift time t1, the control section 40 shifts the driving of the discharge lamp 90 from the first discharge lamp driving to the second discharge lamp driving.

In the second discharge lamp driving, as in the first discharge lamp driving, the control section 40 determines whether a value of the lamp voltage Vla is large with respect to the second threshold voltage Vla21 and sets one of the third control and the fourth control as the control method for the discharge lamp driving section 230. In the fourth control, when the lamp voltage Vla is larger than a second shift voltage Vla22 and a continuous execution time of the fourth control is equal to or longer than a second shift time t2, the control section 40 shifts the driving of the discharge lamp 90 from the second discharge lamp driving to third discharge lamp driving.

A rate of the direct current in the third control is, for example, substantially equivalent to the rate of the direct current in the first control. A rate of the direct current in the fourth control is larger than the rate of the direct current in the third control and larger than the rate of the direct current in the second control. The second threshold voltage Vla21 is larger than the first threshold voltage Vla11. The second shift time t2 may be the same as or may be different from the first shift time t1.

Note that, in this specification, the substantial equivalence of the rates of the direct current includes a range in which a ratio of the rates of the direct current to be compared is approximately 0.9 or more and 1.1 or less.

In the third discharge lamp driving, as in the first discharge lamp driving, the control section 40 determines whether a value of the lamp voltage Vla is large with respect to a third threshold voltage Vla31. The control section 40 sets one of the fifth control and the sixth control as the control method for the discharge lamp driving section 230. In the sixth control, when the lamp voltage Vla is larger than a third shift voltage Vla32 and a continuous execution time of the sixth control is equal to or longer than a third shift time t3, the control section 40 shifts the driving of the discharge lamp 90 from the third discharge lamp driving to the fourth discharge lamp driving.

A rate of the direct current in the fifth control is, for example, substantially equivalent to the rate of the direct current in the third control. A rate of the direct current in the sixth control is larger than the rate of the direct current in the fifth control and larger than the rate of the direct current in the fourth control. The third threshold voltage Vla31 is larger than the second threshold voltage Vla21. The third shift time t3 may be the same as or may be different from the first shift time t1 or the second shift time t2.

In the fourth discharge lamp driving, as in the first discharge lamp driving, the control section 40 determines whether a value of the lamp voltage Vla is large with respect to a fourth threshold voltage Vla41. The control section 40 sets one of the seventh control and the eighth control as the control method for the discharge lamp driving section 230.

A rate of the direct current in the seventh control is, for example, substantially equivalent to the rate of the direct current in the fifth control. A rate of the direct current in the eighth control is larger than the rate of the direct current in the seventh control and larger than the rate of the direct current in the sixth control. The fourth threshold voltage Vla41 is larger than the third threshold voltage Vla31.

Note that switching of the third control and the fourth control, switching of the fifth control and the sixth control, and switching of the seventh control and the eighth control are basically the same as the switching of the first control and the second control explained in the first embodiment except that a value of a threshold voltage is different. Driving current waveforms in the third control to the eighth control are the same as the driving current waveforms in the first control and the second control.

In the third control of the second discharge lamp driving in this embodiment, a cycle C3 in which unit waveforms are combined is repeated. In the fourth control of the second discharge lamp driving in this embodiment, a cycle C4 in which unit waveforms are combined is repeated.

In the fifth control of the third discharge lamp driving in this embodiment, a cycle C5 in which unit waveforms are combined is repeated. In the sixth control of the third discharge lamp driving in this embodiment, a cycle C6 in which unit waveforms are combined is repeated.

In the seventh control of the fourth discharge lamp driving in this embodiment, a cycle C7 in which unit waveforms are combined is repeated. In the eighth control of the fourth discharge lamp driving in this embodiment, a cycle C8 in which unit waveforms are combined is repeated.

In the cycles C3 to C8 in this embodiment, as in the cycles C1 and C2, for example, the unit waveform DWa1, the unit waveform DWb1, the unit waveform DWc1, the unit waveform DWa2, the unit waveform DWb2, and the unit waveform DWc2 are arranged in this order. Each of the unit waveforms is provided once or a plurality of times in one cycle of the cycles C3 to C8.

An example of the cycle C3 of the third control and the cycle C4 of the fourth control in the second discharge lamp driving is shown in Table 3.

An example of the cycle C5 of the fifth control and the cycle C6 of the sixth control in the third discharge lamp driving is shown in Table 4.

An example of the cycle C7 of the seventh control and the cycle C8 of the eighth control in the fourth discharge lamp driving is shown in Table 5.

TABLE 3

| | | DWa1 | DWb1 | DWc1 | DWa2 | DWb2 | DWc2 |
|---|---|---|---|---|---|---|---|
| | | Cycle C3 | | | | | |
| Second discharge lamp driving | Third control | 1 | 1000 | 1 | 1 | 1000 | 1 |
| | | Cycle C4 | | | | | |
| | Fourth control | 8 | 12 | 1 | 8 | 12 | 1 |

TABLE 4

| | | DWa1 | DWb1 | DWc1 | DWa2 | DWb2 | DWc2 |
|---|---|---|---|---|---|---|---|
| | | Cycle C5 | | | | | |
| Third discharge lamp driving | Fifth control | 1 | 1000 | 1 | 1 | 1000 | 1 |
| | | Cycle C6 | | | | | |
| | Sixth control | 12 | 12 | 1 | 12 | 12 | 1 |

TABLE 5

| | | DWa1 | DWb1 | DWc1 | DWa2 | DWb2 | DWc2 |
|---|---|---|---|---|---|---|---|
| | | \multicolumn{6}{c}{Cycle C7} | | | | | |
| Fourth discharge lamp driving | Seventh control | 1 | 1000 | 1 | 1 | 1000 | 1 |
| | | \multicolumn{6}{c}{Cycle C8} | | | | | |
| | Eighth control | 16 | 12 | 1 | 16 | 12 | 1 |

In the example shown in Table 3, in the cycle C3, in the following order, the unit waveform DWa1 is provided once, the unit waveform DWb1 is continuously provided 1000 times, the unit waveform DWc1 is provided once, the unit waveform DWa2 is provided once, the unit waveform DWb2 is continuously provided 1000 times, and the unit waveform DWc2 is provided once.

In the cycle C4, in the following order, the unit waveform DWa1 is continuously provided eight times, the unit waveform DWb1 is continuously provided twelve times, the unit waveform DWc1 is provided once, the unit waveform DWa2 is continuously provided eight times, the unit waveform DWb2 is continuously provided twelve times, and the unit waveform DWc2 is provided once.

In Table 4 and Table 5, the cycle C5 to the cycle C8 are shown in the same manner.

As shown in Table 3, a rate of the unit waveforms DWa1 and DWa2 in the cycle C4 of the fourth control is larger than a rate of the unit waveforms DWa1 and DWa2 in the cycle C3 of the third control. In other words, a rate of the direct current, that is, the direct current periods PH11 and PH12 in the fourth control is larger than a rate of the direct current, that is, the direct current periods PH11 and PH12 in the third control.

As shown in Table 4, a rate of the unit waveforms DWa1 and DWa2 in the cycle C6 of the sixth control is larger than a rate of the unit waveforms DWa1 and DWa2 in the cycle C5 of the fifth control. In other words, a rate of the direct current, that is, the direct current periods PH11 and PH12 in the sixth control is larger than a rate of the direct current, that is, the direct current periods PH11 and PH12 in the fifth control.

As shown in Table 5, a rate of the unit waveforms DWa1 and DWa2 in the cycle C8 of the eighth control is larger than a rate of the unit waveforms DWa1 and DWa2 in the cycle C7 of the seventh control. In other words, the direct current, that is, the direct current periods PH11 and PH12 in the eighth control is larger than a rate of the direct current, that is, the direct current periods PH11 and PH12 in the seventh control.

As shown in Table 1 referred to in the first embodiment and Table 3 to Table 5, when the second control, the fourth control, the sixth control, and the eighth control are compared, a rate of the direct current increases in the order of the second control, the fourth control, the sixth control, and the eighth control.

Note that, in this specification, a rate of the direct current in the kinds of control is a ratio of the time in which the direct current is supplied to the discharge lamp 90 to execution times in which the kinds of control are executed. In the examples shown in Table 1 and Table 3 to Table 5, the rate of the direct current in the kinds of control is, for example, substantially the same as a rate of a total number of times of the unit waveforms DWa1 and DWa2 to a total number of times of the unit waveforms included in one cycle.

Note that, in this specification, unless particularly noted otherwise, the rate of the unit waveform means a ratio of a total number of times of the unit waveforms set as targets to a total number of times of unit waveforms included in one cycle.

In this embodiment, for example, the rate of the unit waveforms DWb1 and DWb2 and the rate of the unit waveforms DWc1 and DWc2 in the first control, the third control, the fifth control, and the seventh control are adjusted on the basis of values of the threshold voltages. That is, in the first control, the control section 40 adjusts a rate of the first alternating current and a rate of the second alternating current on the basis of a value of the first threshold voltage Vla11. In the third control, the control section 40 adjusts the rate of the first alternating current and the rate of the second alternating current on the basis of a value of the second threshold voltage Vla21. In the fifth control, the control section 40 adjusts the rate of the first alternating current and the rate of the second alternating current on the basis of a value of the third threshold voltage Vla31. In the seventh control, the control section 40 adjusts the rate of the first alternating current and the rate of the second alternating current on the basis of a value of the fourth threshold voltage Vla41.

Specifically, in the kinds of control, the control section 40 sets the rate of the second alternating current larger than the rate of the first alternating current when the threshold voltages are equal to or smaller than a predetermined value and sets the rate of the first alternating current larger than the rate of the second alternating current when the threshold voltages are larger than the predetermined value. The predetermined value is, for example, a value of approximately +5 V with respect to the lamp voltage Vla in the initial period.

In the examples shown in Table 1 and Table 3 to Table 5, for example, the first threshold voltage Vla11 is equal to or smaller than the predetermined value and the second threshold voltage Vla21, the third threshold voltage Vla31, and the fourth threshold voltage Vla41 are larger than the predetermined value. Therefore, as explained above, in the first control shown in Table 1, the rate of the second alternating current, that is, the rate of the unit waveforms DWc1 and DWc2 is larger than the rate of the first alternating current, that is, the rate of the unit waveforms DWb1 and DWb2.

On the other hand, in the second control, the third control, and the fourth control shown in Table 3 to Table 5, the rate of the first alternating current, that is, the rate of the unit waveforms DWb1 and DWb2 is larger than the rate of the second alternating current, that is, the rate of the unit waveforms DWc1 and DWc2.

In the examples shown in Table 3 to Table 5, the cycle C3 of the third control, the cycle C5 of the fifth control, and the cycle C7 of the seventh control are the same.

A selection method for the discharge lamp driving at the time when the discharge lamp 90 is lit is explained.

Figure 13:
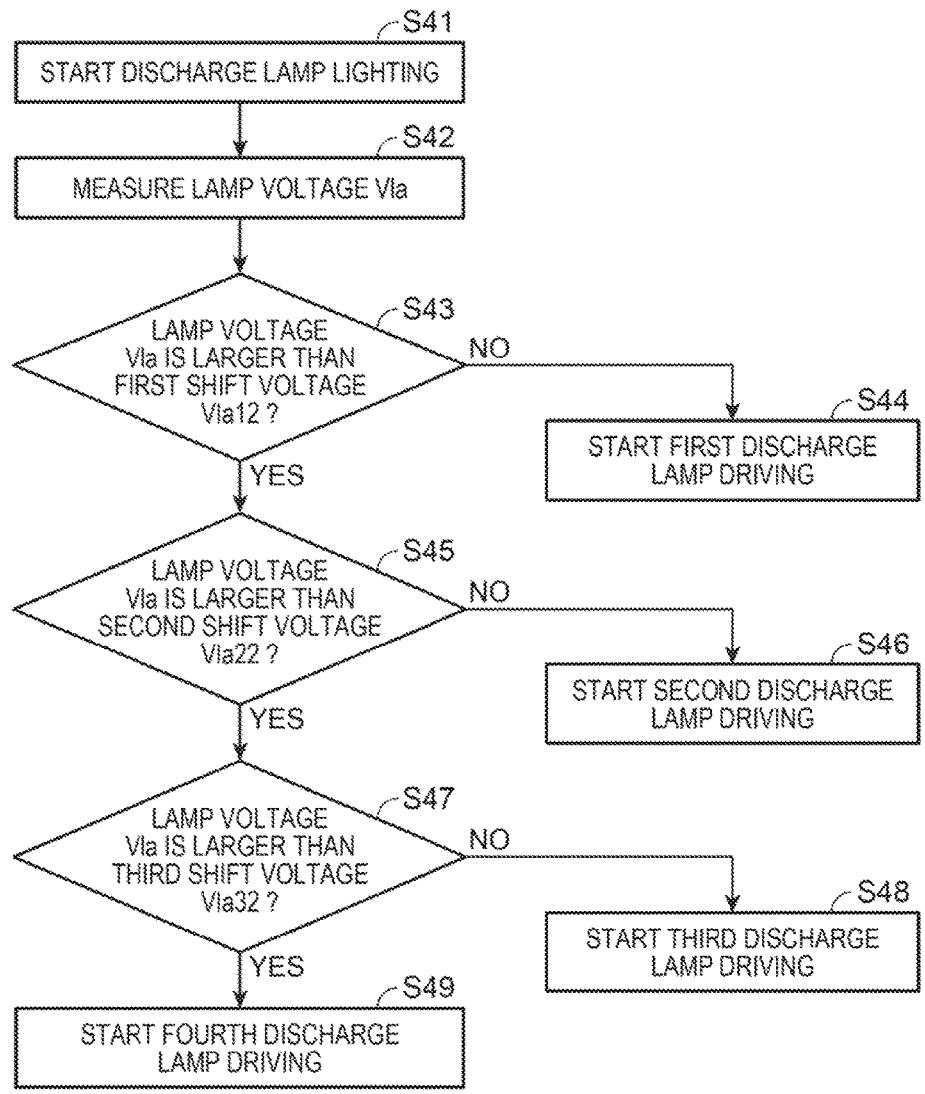
FIG. 13 is a flowchart for explaining an example of a selection method for discharge lamp driving at the time when a discharge lamp in the second embodiment is lit.

FIG. 13 is a flowchart for explaining an example of the selection method for the discharge lamp driving at the time when the discharge lamp 90 is lit.

As shown in FIG. 13, after the lighting of the discharge lamp 90 is started (step S41), the control section 40 measures the lamp voltage Vla with the voltage detecting section of the operation detecting section 60 (step S42). The control section 40 determines whether the lamp voltage Vla is larger than the first shift voltage Vla12 (step S43). If the lamp voltage Vla is equal to or smaller than the first shift voltage Vla12 (NO in step S43), the control section 40 starts the first discharge lamp driving (step S44).

If the lamp voltage Vla is larger than the first shift voltage Vla12 (YES in step S43), the control section 40 determines whether the lamp voltage Vla is larger than the second shift voltage Vla22 (step S45). If the lamp voltage Vla is equal to or smaller than the second shift voltage Vla22 (NO in step S45), the control section 40 starts the second discharge lamp driving (step S46).

If the lamp voltage Vla is larger than the second shift voltage Vla22 (YES in step S45), the control section 40 determines whether the lamp voltage Vla is larger than the third shift voltage Vla32 (step S47). If the lamp voltage Vla is equal to or smaller than the third shift voltage Vla32 (NO in step S47), the control section 40 starts the third discharge lamp driving (step S48). If the lamp voltage Vla is larger than the third shift voltage Vla32 (YES in step S47), the control section 40 starts the fourth discharge light driving (step S49).

As explained above, in this embodiment, the control section 40 selects the discharge lamp driving when the discharge lamp 90 is lit.

Note that, when the selection method explained above is adopted as the selection method for the discharge lamp driving at the time when the discharge lamp 90 is lit, the discharge lamp driving in a stage preceding the discharge lamp driving executed before the discharge lamp 90 is extinguished is sometimes selected. Specifically, for example, even when the second discharge lamp driving is executed before the extinction of the discharge lamp 90, when the discharge lamp 90 is lit again after being once extinguished, the first discharge lamp driving is executed if the lamp voltage Vla is equal to or smaller than the first shift voltage Vla12.

The control by the control section 40 is more specifically explained.

An example of the threshold voltages and the shift voltages in the first discharge lamp driving to the fourth discharge lamp driving is shown in Table 6.

TABLE 6

| First discharge lamp driving | First threshold voltage Vla11 (V) | 65 |
| --- | --- | --- |
| | First shift voltage Vla12 (V) | 68 |
| Second discharge lamp driving | Second threshold voltage Vla21 (V) | 75 |
| | Second shift voltage Vla22 (V) | 78 |
| Third discharge lamp driving | Third threshold voltage Vla31 (V) | 85 |
| | Third shift voltage Vla32 (V) | 88 |
| Fourth discharge lamp driving | Fourth threshold voltage Vla41 (V) | 95 |

In the example shown in Table 6, assume the lamp voltage Vla in an initial period is, for example, 63 V. That is, in a lighting initial period of the discharge lamp 90, the lamp voltage Vla is equal to or smaller than the first shift voltage Vla12 (68 V). Therefore, the control section 40 executes the first discharge lamp driving. In the lighting initial period of the discharge lamp 90, the lamp voltage Vla is equal to or smaller than the first threshold voltage Vla11 (65 V). Therefore, in the first discharge lamp driving, the control section 40 sets the control method for the discharge lamp driving section 230 to the first control and controls the discharge lamp driving section 230 with the first control.

When the discharge lamp 90 is driven for a long time by the first control, the discharge lamp 90 is deteriorated, the protrusion 552p is less easily formed, and the interelectrode distance increases. Consequently, the lamp voltage Vla rises. When the lamp voltage Vla rises to be larger than the first threshold voltage Vla11 (65 V), at predetermined setting timing, the control section 40 sets the control method for the discharge lamp driving section 230 to the second control.

The rate of the direct current in the second control is larger than the rate of the direct current in the first control. Therefore, in the second control, the first electrode 92 easily melts. Compared with the first control, the protrusion 552p is easily formed. Consequently, the protrusion 552p grows, the interelectrode distance decreases, and the lamp voltage Vla decreases. When the lamp voltage Vla drops to be equal to or smaller than the first threshold voltage Vla11 (65V), at predetermined setting timing, the control section 40 sets the control method for the discharge lamp driving section 230 to the first control again.

The setting of the first control and the second control is alternately repeated, whereby the lamp voltage Vla is maintained within a fixed range centering on the first threshold voltage Vla11 (65 V) while repeating a rise and a drop across the first threshold voltage Vla11.

When the first discharge lamp driving is performed for a long time, according to the deterioration of the discharge lamp 90, the lamp voltage Vla sometimes does not drop in the second control. In that case, the control section 40 switches the driving of the discharge lamp 90 from the first discharge lamp driving to the second discharge lamp driving. Specifically, for example, when the lamp voltage Vla is larger than the first shift voltage Vla12 (68 V) and a continuous execution time of the second control is equal to or longer than the first shift time t1, for example, 20 minutes or longer, the control section 40 switches the driving of the discharge lamp 90 from the first discharge lamp driving to the second discharge lamp driving.

In the second discharge lamp driving, as in the first discharge lamp driving, the setting of the third control and the setting of the fourth control are alternately repeated. Consequently, the lamp voltage Vla is maintained within a fixed range centering on the second threshold voltage Vla21 (75 V) while repeating a rise and a drop across the second threshold voltage Vla21 (75 V). When the lamp voltage Vla does not drop in the fourth control, for example, when the lamp voltage Vla is larger than the second shift voltage Vla22 (78 V) and a continuous execution time of the fourth control is equal to or longer than the second shift time t2, for example, 20 minutes or longer, the control section 40 switches the driving of the discharge lamp 90 from the second discharge lamp driving to the third discharge lamp driving.

Thereafter, similarly, the third discharge lamp driving and the fourth discharge lamp driving are executed.

The control by the control section 40 can be represented as a discharge lamp driving method as well. That is, the discharge lamp driving method according to this embodiment is a discharge lamp driving method for supplying the driving current I to the discharge lamp 90 and driving the discharge lamp 90. The discharge lamp driving method includes first discharge lamp driving for executing first control and second control for supplying the driving current I including a direct current and an alternating current to the discharge lamp 90 and second discharge lamp driving for executing third control and fourth control for supplying the driving current I including the direct current and the alternating current to the discharge lamp 90. The discharge lamp driving method includes, in the first discharge lamp driving, executing the first control when the lamp voltage Vla is equal to or smaller than the first threshold voltage Vla11 at predetermined setting timing and executing the second control when the lamp voltage Vla is larger than the first threshold voltage Vla11 at the predetermined setting timing and, in the second discharge lamp driving, executing the third control when the lamp voltage Vla is equal to or smaller than the second threshold voltage Vla21 larger than the first threshold voltage Vla11 at the predetermined setting timing and executing the fourth control when the lamp voltage Vla is larger than the second threshold voltage Vla21 at the predetermined setting timing. The rate of the direct current in the second control is larger than the rate of the direct current in the first control. The rate of the direct current in the fourth control is larger than the rate of the direct current in the third control and larger than the rate of the direct current in the second control. In the second control of the first discharge lamp driving, the discharge lamp driving method shifts from the first discharge lamp driving to the second discharge lamp driving when the lamp voltage Vla is larger than the first shift voltage Vla12 equal to or larger than the first threshold voltage Vla11 and a continuous execution time of the second control is equal to or longer than the first shift time t1.

According to this embodiment, the control section 40 is capable of executing the first discharge lamp driving and the second discharge lamp driving. Therefore, it is possible to further increase the life of the discharge lamp 90. This is explained in detail below.

Figure 14:
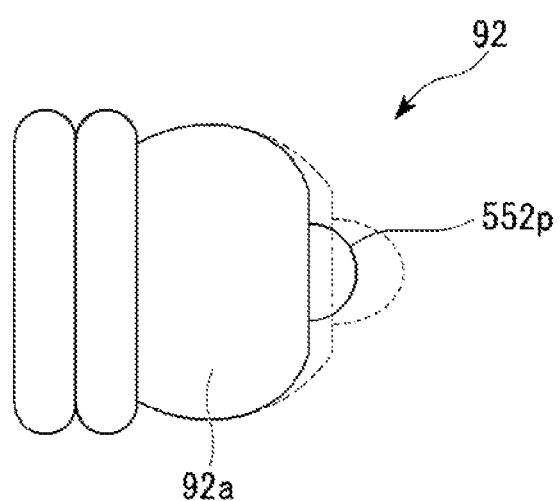
FIG. 14 is a diagram showing a change of an electrode of a discharge lamp.

FIG. 14 is a diagram showing the first electrode 92 at the time when the discharge lamp 90 is further driven using the first discharge lamp driving for a long time from the state shown in FIG. 10C. In FIG. 14, a broken line indicates the shape of the first electrode 92 in FIG. 10C.

As shown in FIG. 14, when the first discharge lamp driving is further executed for a long time, the entire first electrode 92 is sometimes worn and shortened. In this case, the lamp voltage Vla of the discharge lamp 90 rises. Even if the second control is executed, the lamp voltage Vla does not drop to be equal to or smaller than the first threshold voltage Vla11. Therefore, the first control is not set and only the second control continues to be executed. When this state lasts for a long time, since the second control is executed for a long time, the electrode main body 92a of the first electrode 92 is worn and thinned like the shape shown in FIG. 10B. Therefore, the life of the discharge lamp 90 sometimes cannot be sufficiently increased by only the first discharge lamp driving.

On the other hand, according to this embodiment, the control section 40 shifts the driving of the discharge lamp 90 from the first discharge lamp driving to the second discharge lamp driving when the lamp voltage Vla is larger than the first shift voltage Vla12 and the continuous execution time of the second control is equal to or longer than the first shift time t1. The rate of the direct current in the fourth control of the second discharge lamp driving is larger than the rate of the direct current in the second control of the first discharge lamp driving. Therefore, even when the lamp voltage Vla cannot be reduced by the second control, it is possible to reduce the lamp voltage Vla using the fourth control. Consequently, in the second discharge lamp driving, by alternately repeating the third control and the fourth control, it is easy to maintain the lamp voltage Vla within a fixed range centering on the second threshold voltage Vla21 while maintaining the shape of the first electrode 92 in a stable shape.

Consequently, according to this embodiment, it is possible to further increase the life of the discharge lamp 90.

According to this embodiment, the first shift voltage Vla12 is larger than the first threshold voltage Vla11. Therefore, when a value of the lamp voltage Vla increases to a certain degree and deterioration of the discharge lamp 90 worsens to a certain degree, it is possible to shift the driving of the discharge lamp 90 from the first discharge lamp driving to the second discharge lamp driving. That is, it is possible to more appropriately switch the driving of the discharge lamp 90 according to a deterioration state of the discharge lamp 90. Therefore, according to this embodiment, it is possible to further increase the life of the discharge lamp 90.

According to this embodiment, the first shift voltage Vla12 is smaller than the second threshold voltage Vla21. Therefore, in the first discharge lamp driving, it is possible to shift the driving of the discharge lamp 90 to the second discharge lamp driving before the deterioration of the discharge lamp 90 excessively worsens. Consequently, according to this embodiment, it is possible to more appropriately switch the driving of the discharge lamp 90. Therefore, it is possible to further increase the life of the discharge lamp 90.

According to this embodiment, the rate of the direct current in the third control is substantially equivalent to the rate of the direct current in the first control. Therefore, compared with a difference in the rate of the direct current between the first control and the second control, a difference in the rate of the direct current between the third control and the fourth control is larger. Consequently, in the second discharge lamp driving, a difference in a heat load applied to the discharge lamp 90 can be increased more than in the first discharge lamp driving. The protrusion 552p of the first electrode 92 is more easily grown. Therefore, when the deterioration of the discharge lamp 90 worsens to a certain degree and the protrusion 552p of the first electrode 92 less easily grows, the protrusion 552p of the first electrode 92 is easily grown by the fourth control of the second discharge lamp driving. As a result, according to this embodiment, it is possible to further increase the life of the discharge lamp 90.

According to this embodiment, in the first control, the third control, the fifth control, and the seventh control, the control section 40 adjusts the rate of the first alternating current and the rate of the second alternating current on the basis of values of the threshold voltages. Therefore, as explained in the first embodiment, in the kinds of discharge lamp driving, according to the magnitudes of the threshold voltages, it is possible to appropriately adjust the rate of the first alternating current and the rate of the second alternating current such that the first electrode 92 can be stably maintained.

Specifically, according to this embodiment, in the first control, the third control, the fifth control, and the seventh control, the control section 40 sets the rate of the second alternating current larger than the rate of the first alternating current when the threshold voltages are equal to or smaller than the predetermined value and sets the rate of the first alternating current larger than the rate of the second alternating current when the threshold voltages are larger than the predetermined value.

When the threshold voltages are relatively small, that is, equal to or smaller than the predetermined value, by increasing the rate of the second alternating current having the second frequency lower than the first frequency of the first alternating current, in the kinds of discharge lamp driving, it is possible to suppress the protrusion 552p from excessively growing.

On the other hand, when the threshold voltages are relatively large, that is, larger than the predetermined value, by increasing the rate of the first alternating current having the first frequency higher than the second frequency of the second alternating current, in the kinds of discharge lamp driving, it is possible to suppress the protrusion 552p from being excessively worn. Consequently, according to this embodiment, it is possible to more stably maintain the first electrode 92.

Note that, in this embodiment, a configuration and a method explained below may be adopted.

In the above explanation, as the driving of the discharge lamp 90, the control section 40 can execute the four kinds of driving, i.e., the first discharge lamp driving to the fourth discharge lamp driving. However, the invention is not limited to this. In this embodiment, as the driving of the discharge lamp 90, the control section 40 may be capable of executing only two or three kinds of driving or may be capable of executing five or more kinds of driving. For example, as the number of kinds of executable discharge lamp driving is larger, it is easy to appropriately change the driving of the discharge lamp 90 according to the deterioration of the discharge lamp 90. Therefore, it is easy to increase the life of the discharge lamp 90.

In this embodiment, for example, when the discharge lamp 90 is extinguished, discharge lamp driving being executed may be stored. The stored discharge lamp driving may be executed when the discharge lamp 90 is lit again.

In the above explanation, at the predetermined setting timing, it is determined whether the kinds of discharge lamp driving are shifted. However, the invention is not limited to this. In this embodiment, the lamp voltage Vla may be always monitored to determine whether the discharge lamp driving is shifted. In this case, for example, after the first control is set, the discharge lamp driving is sometimes shifted to the second discharge lamp driving before a predetermined time elapses.

In this embodiment, the first threshold voltage Vla11 and the first shift voltage Vla12 may be the same value. In this case, at a point when the lamp voltage Vla rises to be larger than the first threshold voltage Vla11 and the second control is set, the lamp voltage Vla rises to be larger than the first shift voltage Vla12. Therefore, in this case, when the continuous execution time of the second control increases to be equal to or longer than the first shift time t1, the control section 40 shifts the driving of the discharge lamp 90 from the first discharge lamp driving to the second discharge lamp driving.

Note that, in the embodiment, the example is explained in which the invention is applied to the transmission type projector. However, the invention can also be applied to a reflection type projector. The "transmission type" means that a liquid crystal light valve including a liquid crystal panel is a light-transmitting type. The "reflection type" means that the liquid crystal light valve is a light-reflecting type. Note that the light modulating device is not limited to the liquid crystal panel and the like and may be, for example, a light modulating device including a micro-mirror.

In the embodiment, the example of the projector 500 including the three liquid crystal panels 560R, 560G, and 560B (liquid crystal light valves 330R, 330G, and 330B) is explained. However, the invention can also be applied to a projector including only one liquid crystal panel and a projector including four or more liquid crystal panels.

The configurations explained above can be combined as appropriate as long as the configurations are not contradictory to one another.

The entire disclosure of Japanese Patent Application No.: 2015-045579, filed Mar. 9, 2015 and 2015-045581, filed Mar. 9, 2015 are expressly incorporated by reference herein.

What is claimed is:

1. A discharge lamp driving device comprising:
   a discharge lamp driving section configured to supply a driving current to a discharge lamp;
   a control section configured to control the discharge lamp driving section; and
   a voltage detecting section configured to detect an interelectrode voltage of the discharge lamp, wherein
   the control section is configured to execute a first discharge lamp driving for executing a first control and a second control for supplying the driving current including a direct current and an alternating current to the discharge lamp,
   in the first discharge lamp driving, the control section executes the first control when the interelectrode voltage is equal to or smaller than a first threshold voltage at predetermined setting timing and executes the second control when the interelectrode voltage is larger than the first threshold voltage at the predetermined setting timing, and
   a rate of the direct current in the second control is larger than a rate of the direct current in the first control, wherein
   the alternating current in the first control includes a first alternating current having a first frequency and a second alternating current having a second frequency lower than the first frequency,
   the control section adjusts a rate of the first alternating current and a rate of the second alternating current on the basis of the first threshold voltage, and
   the control section sets the rate of the second alternating current larger than the rate of the first alternating current when the first threshold voltage is equal to or smaller than a predetermined value and sets the rate of the first alternating current larger than the rate of the second alternating current when the first threshold voltage is larger than the predetermined value.

2. The discharge lamp driving device according to claim 1, wherein a total length of DC duration for which the DC current is supplied in the second control is larger than a total length of DC duration for which the DC current is supplied in the first control.

3. The discharge lamp driving device according to claim 1, wherein the first frequency is equal to or higher than 500 Hz.

4. The discharge lamp driving device according to claim 1, wherein the second frequency is equal to or lower than 280 Hz.

5. The discharge lamp driving device according to claim 1, wherein
   the control section is configured to execute a second discharge lamp driving for executing a third control and a fourth control for supplying the driving current including the direct current and the alternating current to the discharge lamp, in the second discharge lamp driving, the control section executes the third control when the interelectrode voltage is equal to or smaller than a second threshold voltage larger than the first threshold voltage at the predetermined setting timing and executes the fourth control when the interelectrode voltage is larger than the second threshold voltage at the predetermined setting timing, a rate of the direct current in the fourth control is larger than a rate of the direct current in the third control and larger than the rate of the direct current in the second control, and in the second control of the first discharge lamp driving, the control section shifts from the first discharge lamp driving to the second discharge lamp driving when the interelectrode voltage is larger than a first shift voltage equal to or larger than the first threshold voltage and a continuous execution time of the second control is equal to or longer than a first shift time.

6. The discharge lamp driving device according to claim 5, wherein a total length of DC duration for which the DC current is supplied in the fourth control is larger than a total length of DC duration for which the DC current is supplied in the third control and is larger than a total length of DC duration for which the DC current is supplied in the second control.

7. The discharge lamp driving device according to claim 5, wherein the first shift voltage is larger than the first threshold voltage.

8. The discharge lamp driving device according to claim 5, wherein the first shift voltage is smaller than the second threshold voltage.

9. The discharge lamp driving device according to claim 5, wherein the rate of the direct current in the third control is substantially equivalent to the rate of the direct current in the first control.

10. The discharge lamp driving device according to claim 5, wherein each of the alternating current in the first control and the alternating current in the third control includes a first alternating current having a first frequency and a second alternating current having a second frequency lower than the first frequency, and the control section adjusts, in the first control, a rate of the first alternating current and a rate of the second alternating current on the basis of the first threshold voltage and adjusts, in the third control, the rate of the first alternating current and the rate of the second alternating current on the basis of the second threshold voltage.

11. The discharge lamp driving device according to claim 10, wherein the control section sets, in the first control, the rate of the second alternating current larger than the rate of the first alternating current when the first threshold voltage is equal to or smaller than a predetermined value and sets the rate of the first alternating current larger than the rate of the second alternating current when the first threshold voltage is larger than the predetermined value, and sets, in the third control, the rate of the second alternating current larger than the rate of the first alternating current when the second threshold voltage is equal to or smaller than the predetermined value and sets the rate of the first alternating current larger than the rate of the second alternating current when the second threshold voltage is larger than the predetermined value.

12. The discharge lamp driving device according to claim 5, wherein the control section is configured to execute a third discharge lamp driving for executing a fifth control and a sixth control for supplying the driving current including the direct current and the alternating current to the discharge lamp, in the third discharge lamp driving, the control section executes the fifth control when the interelectrode voltage is equal to or smaller than a third threshold voltage larger than the second threshold voltage at the predetermined setting timing and executes the sixth control when the interelectrode voltage is larger than the third threshold voltage at the predetermined setting timing, a rate of the direct current in the sixth control is larger than a rate of the direct current in the fifth control and larger than the rate of the direct current in the fourth control, and in the fourth control of the second discharge lamp driving, the control section shifts from the second discharge lamp driving to the third discharge lamp driving when the interelectrode voltage is larger than a second shift voltage equal to or larger than the third threshold voltage and a continuous execution time of the fourth control is equal to or longer than a second shift time.

13. The discharge lamp driving device according to claim 12, wherein a total length of DC duration for which the DC current is supplied in the sixth control is larger than a total length of DC duration for which the DC current is supplied in the fifth control and is larger than a total length of DC duration for which the DC current is supplied in the fourth control.

14. The discharge lamp driving device according to claim 1, wherein the predetermined setting timing is provided for each predetermined time.

15. A projector comprising:
a discharge lamp configured to emit light;
the discharge lamp driving device according to claim 1;
a light modulating element configured to modulate light emitted from the discharge lamp according to a video signal; and
a projection optical system configured to project the light modulated by the light modulating element.

16. A projector comprising:
a discharge lamp configured to emit light;
the discharge lamp driving device according to claim 5;
a light modulating element configured to modulate light emitted from the discharge lamp according to a video signal; and
a projection optical system configured to project the light modulated by the light modulating element.

17. A discharge lamp driving method for supplying a driving current to a discharge lamp and driving the discharge lamp, the discharge lamp driving method including a first discharge lamp driving for executing a first control and a second control for supplying the driving current including a direct current and an alternating current to the discharge lamp, the method comprising, in the first discharge lamp driving, executing the first control when an interelectrode voltage of the discharge lamp is equal to or smaller than a first threshold voltage at predetermined setting timing, and executing the second control when the interelectrode voltage is larger than the first threshold voltage at the predetermined setting timing, wherein a rate of the direct current in the second control is larger than a rate of the direct current in the first control, and the alternating current in the first control includes a first alternating current having a first frequency and a second alternating current having a second frequency lower than the first frequency, the method further comprising:

adjusting a rate of the first alternating current and a rate of the second alternating current on the basis of the first threshold voltage, and setting the rate of the second alternating current larger than the rate of the first alternating current when the first threshold voltage is equal to or smaller than a predetermined value and sets the rate of the first alternating current larger than the rate of the second alternating current when the first threshold voltage is larger than the predetermined value.

18. The discharge lamp driving method according to claim 17, wherein the discharge lamp driving method includes a second discharge lamp driving for executing a third control and a fourth control for supplying the driving current including the direct current and the alternating current to the discharge lamp, the discharge lamp driving method further comprises, in the second discharge lamp driving, executing the third control when the interelectrode voltage is equal to or smaller than a second threshold voltage larger than the first threshold voltage at the predetermined setting timing and executing the fourth control when the interelectrode voltage is larger than the second threshold voltage at the predetermined setting timing, a rate of the direct current in the fourth control is larger than a rate of the direct current in the third control and larger than the rate of the direct current in the second control, and in the second control of the first discharge lamp driving, the discharge lamp driving method shifts from the first discharge lamp driving to the second discharge lamp driving when the interelectrode voltage is larger than a first shift voltage equal to or larger than the first threshold voltage and a continuous execution time of the second control is equal to or longer than a first shift time.

* * * * *